(12) United States Patent
Elliott

(10) Patent No.: US 9,112,997 B2
(45) Date of Patent: Aug. 18, 2015

(54) METHOD, APPARATUS AND PROGRAM FOR PROVIDING USER-SELECTED ALERTING SIGNALS IN TELECOMMUNICATIONS DEVICES

(75) Inventor: Brig Barnum Elliott, Arlington, MA (US)

(73) Assignees: Verizon Patent and Licensing Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 1541 days.

(21) Appl. No.: 11/949,429

(22) Filed: Dec. 3, 2007

(65) Prior Publication Data

US 2008/0089511 A1 Apr. 17, 2008

Related U.S. Application Data

(62) Division of application No. 09/777,969, filed on Feb. 5, 2001, now Pat. No. 7,305,256.

(51) Int. Cl.
*H04M 3/00* (2006.01)
*H04M 19/04* (2006.01)
*H04M 1/725* (2006.01)

(52) U.S. Cl.
CPC ........ *H04M 19/041* (2013.01); *H04M 1/72519* (2013.01)

(58) Field of Classification Search
CPC ... H04M 3/02; H04M 3/42051; H04M 3/436; H04M 3/42068; H04M 3/42153; H04M 3/42; H04M 19/041; H04M 3/42229; H04M 7/1245; H04M 7/1255; H04M 1/2535; H04M 1/578; H04M 3/42017; H04M 3/42042

USPC .................................. 379/372–376.02, 418
See application file for complete search history.

(56) References Cited

U.S. PATENT DOCUMENTS

| | | | | |
|---|---|---|---|---|
| 5,452,354 A * | 9/1995 | Kyronlahti et al. | ...... | 379/373.02 |
| 5,594,784 A * | 1/1997 | Velius | .......................... | 379/88.02 |
| 5,898,760 A * | 4/1999 | Smets et al. | ............... | 379/88.21 |

(Continued)

OTHER PUBLICATIONS

Y Yukari Iwatani, Custom Ringing Strikes Chord with Cell Phone Users, wysiwyg://11/http://www.reuters.com/news.sub.--arti... YKEEARKIWD?type-tec- .hnologynews&StoryID=446007, Dec. 11, 2001, 4 pages.

*Primary Examiner* — Duc Nguyen
*Assistant Examiner* — Assad Mohammed

(57) ABSTRACT

A method for operating a user communication device (18*a*, 18*b*, 19*a*, 19*b*), and a program and user communication device that operate in accordance with that method. An interface (2*d*, 2*b*, 23, 22) of the communication device (18*a*, 18*b*, 19*a*, 19*b*) is operated to enter identifiers identifying respective calling sources (18*a*, 18*b*, 19*a*, 19*b*) from which call signals may be received. The interface also is operated for entering into the device (18*a*, 18*b*, 19*a*, 19*b*) electrical signals representing corresponding audible signals that are to be individually generated in response to calls being received from the respective calling sources (18*a*, 18*b*, 19*a*, 19*b*). The identifiers are stored in a memory (2*c*, 24) in association with respective ones of the electrical signals. Accordingly, when a call signal is later received from one of the calling sources, an identifier included in the signal is correlated to a corresponding stored identifier and to a corresponding stored electrical signal, and the audible signal represented by that electrical signal is then generated to indicate the receipt of the call from the calling source.

37 Claims, 7 Drawing Sheets

(56) References Cited

U.S. PATENT DOCUMENTS

| | | | |
|---|---|---|---|
| 5,926,537 A | 7/1999 | Birze | |
| 6,018,654 A | 1/2000 | Valentine et al. | |
| 6,070,053 A * | 5/2000 | Yamashita | 340/7.58 |
| 6,094,587 A | 7/2000 | Armanto et al. | |
| 6,160,877 A * | 12/2000 | Tatchell et al. | 379/197 |
| 6,343,120 B1 * | 1/2002 | Rhodes | 379/142.01 |
| 6,351,639 B1 * | 2/2002 | Motohashi | 455/420 |
| 6,366,791 B1 * | 4/2002 | Lin et al. | 455/567 |
| 6,418,330 B1 | 7/2002 | Lee | |
| 6,573,825 B1 | 6/2003 | Okano | |
| 6,606,508 B2 | 8/2003 | Becker et al. | |
| 6,671,370 B1 * | 12/2003 | Heinonen et al. | 379/373.02 |
| 6,707,908 B1 | 3/2004 | Nagasawa | |
| 6,990,321 B1 * | 1/2006 | Peters | 455/74.1 |
| 2001/0014616 A1 * | 8/2001 | Matsuda et al. | 455/567 |

* cited by examiner

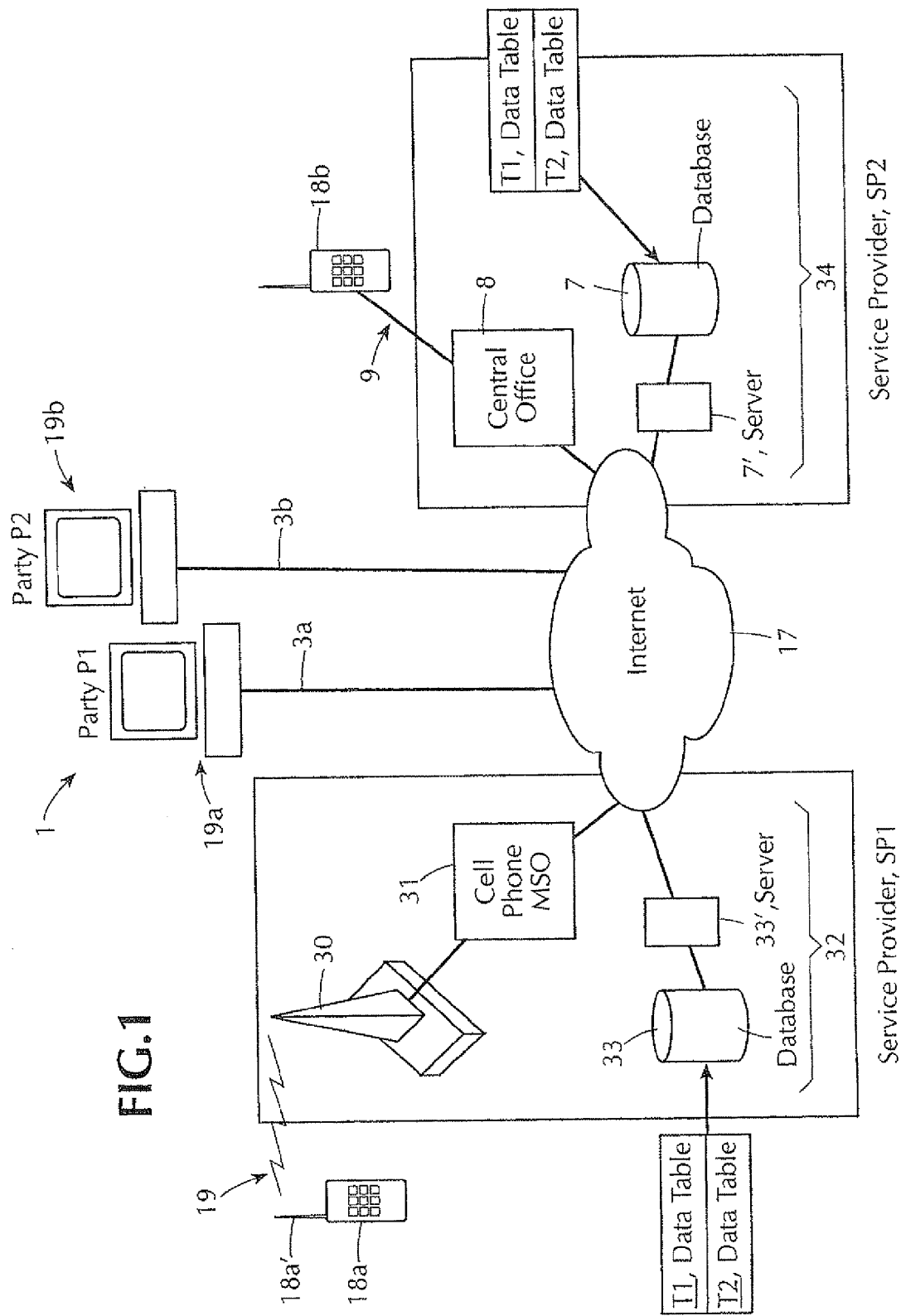

METHOD, APPARATUS AND PROGRAM FOR PROVIDING USER-SELECTED ALERTING SIGNALS IN TELECOMMUNICATIONS DEVICES

CROSS REFERENCE TO RELATED APPLICATIONS

The present application is a divisional application of U.S. patent application Ser. No. 09/777,969 filed on Feb. 5, 2001, which will issue on Dec. 4, 2007 as U.S. Pat. No. 7,305,256, which is incorporated herein by reference in its entirety.

BACKGROUND OF THE INVENTION

1. Field of the Invention

This invention relates generally to user communication devices, and in particular to a method, apparatus, and program for providing user-selected alerting signals in telephones and other user communication devices.

2. Related Art

Conventional telephones typically generate some type of alerting signal, such as a ringing tone, in response to receiving an incoming call signal, to alert the user of the receipt of a call. Typically, a telephone is capable of generating only one type of ringing signal, and generates that signal whenever a call from any source device is received. With such conventional telephones, therefore, the user has no idea who the calling party is until he or she picks up the handset and the calling party identifies itself.

In the past several years, caller identification systems have been developed, to inform users of the identity of a calling party before a conversation begins. Such caller identification systems process the incoming call signal to determine the calling telephone number and/or the actual identity (such as the name) of the calling party, and present that information to the user on a visual display, such as a liquid crystal display. When the phone rings to indicate the receipt of the call, the user typically walks to the phone, looks at the display and makes a determination as to whether her or she wants to pick up the handset and have a conversation with the caller.

A primary drawback of such caller identification devices, however, stems from the use of a visual display to convey information. More specifically, because those systems present the identification information in a completely visual, rather than audible, format, they require the user to be at the telephone or at least in close enough of a proximity to view the display, in order to know who is calling. Thus, a called party who is, for example, watching television in the living room, and whose telephone is in the kitchen, would need to get up, walk to the telephone, and look at the display, perhaps only to determine that he or she does not want to take that call in the first place. Such occurrences can be frustrating and annoying to the user.

At least some telephones and Private Branch Exchanges (PBX) equipment have the capability to enable very crude audible caller identification. For example, some private network telephones (such as telephones used in an office environment) generate one type of ringing sequence (such as a single ring) in response to calls received from equipment located in the network, and another type of ringing sequence (such as two very close temporally-spaced rings) in response to calls being received from equipment located outside of the network. By recognizing the ringing sequence, the called party can discern if the call is an "inside" or "outside" call. In some cases, office telephones are configured to both ring in different sequences for inside and outside calls, and to visually display the name and/or number of the calling party. The caller audible identification enabled by such systems, however, is extremely rudimentary, in that it distinguishes only between inside and outside calls, and does not give any further indication as to the identity of the calling party.

There therefore exists a need for a new caller identification technique that takes an entirely fresh approach, and uses audible signals to identify calling parties which a much greater level of specificity than the prior, out-dated systems discussed above.

SUMMARY OF THE INVENTION

It is an object of this invention to provide a method, apparatus, and program for enabling a calling source to be identified at a receiving device, by generating a particular type of audible alerting signal at the receiving device, in response to receiving an incoming call signal from the calling source.

It is another object of this invention to provide a method, apparatus, and program for enabling a party to select a type of alerting signal to be generated at a receiving device in response to the receiving device receiving an incoming call signal from a particular calling source.

It is a further object of this invention to provide a method, apparatus, and program for enabling a user-selected alerting signal to be generated at a receiving device when a call signal from a particular calling source is received by that receiving device.

Further objects and advantages of this invention will become apparent from a consideration of the drawings and ensuing description.

The foregoing and other problems are overcome and the objects of the invention are realized by a method for operating a user communication system, and a program and communication system that operate in accordance with that method.

In accordance with one embodiment of the invention, the communication system comprises a plurality of user communication devices, and the method comprises a step of providing a digital representation of a corresponding audible signal in each of a plurality of memory locations of a memory of a first one of user communication devices. A next step includes forwarding a call signal from a second one of the user communication devices towards the first user communication device. After the call signal is eventually received at the first user communication device, further steps are performed of selecting one of the memory locations, and generating the audible signal represented by the digital representation stored in the selected memory location.

Each digital representation may be provided in the memory of the first user communication device using various techniques. For example, an audible signal may be applied to an input of a microphone of the device, for causing the microphone to generate a corresponding analog signal, which is then converted to digital form by an A/D converter and stored in the memory. Also by example, a digital representation of an audible signal may be downloaded to the first user communication device from a database included in a network which is in communication with the device, or may be downloaded directly to the device from an external audio source coupled to the device.

The selection of the memory locations preferably is performed based on some predetermined criteria, such as a time/date at which the call is received, information pre-programmed into the device, a telephone number included in the received call signal, etc.

In accordance with another embodiment of this invention, a method comprises steps of providing a digital representation of an audible signal in a memory of a first user communication device, and forwarding a call signal that includes the digital representation towards a second user communication device. Thereafter, when the call signal is eventually received at the second user communication device, further step is performed of generating the audible signal represented by the digital representation included in the received call signal.

In accordance with another embodiment of this invention, information (e.g., a telephone number) identifying the calling source is extracted from the received call signal in the second user communication device, and is then compared with pre-stored information to determine it the receiving device is authorized to generate the audible signal represented by the received digital representation. This procedure prevents the device from generating, for example, sounds which the user may not wish to hear, such as, for example, commercial advertisements.

Any suitable types of user communication device may be used in this invention, such as, for example, a telephone, a radiotelephone, an information appliance, or a pager.

BRIEF DESCRIPTION OF THE DRAWINGS

The present invention will be more readily understood from a detailed description of the preferred embodiments taken in conjunction with the following figures:

FIG. 1 is a block diagram of a communication system that is suitable for practicing this invention.

Identically labeled elements appearing in different ones of the figures refer to the same elements but may not be referenced in the description for all figures.

DETAILED DESCRIPTION OF THE PREFERRED EMBODIMENTS

Figure 2A:
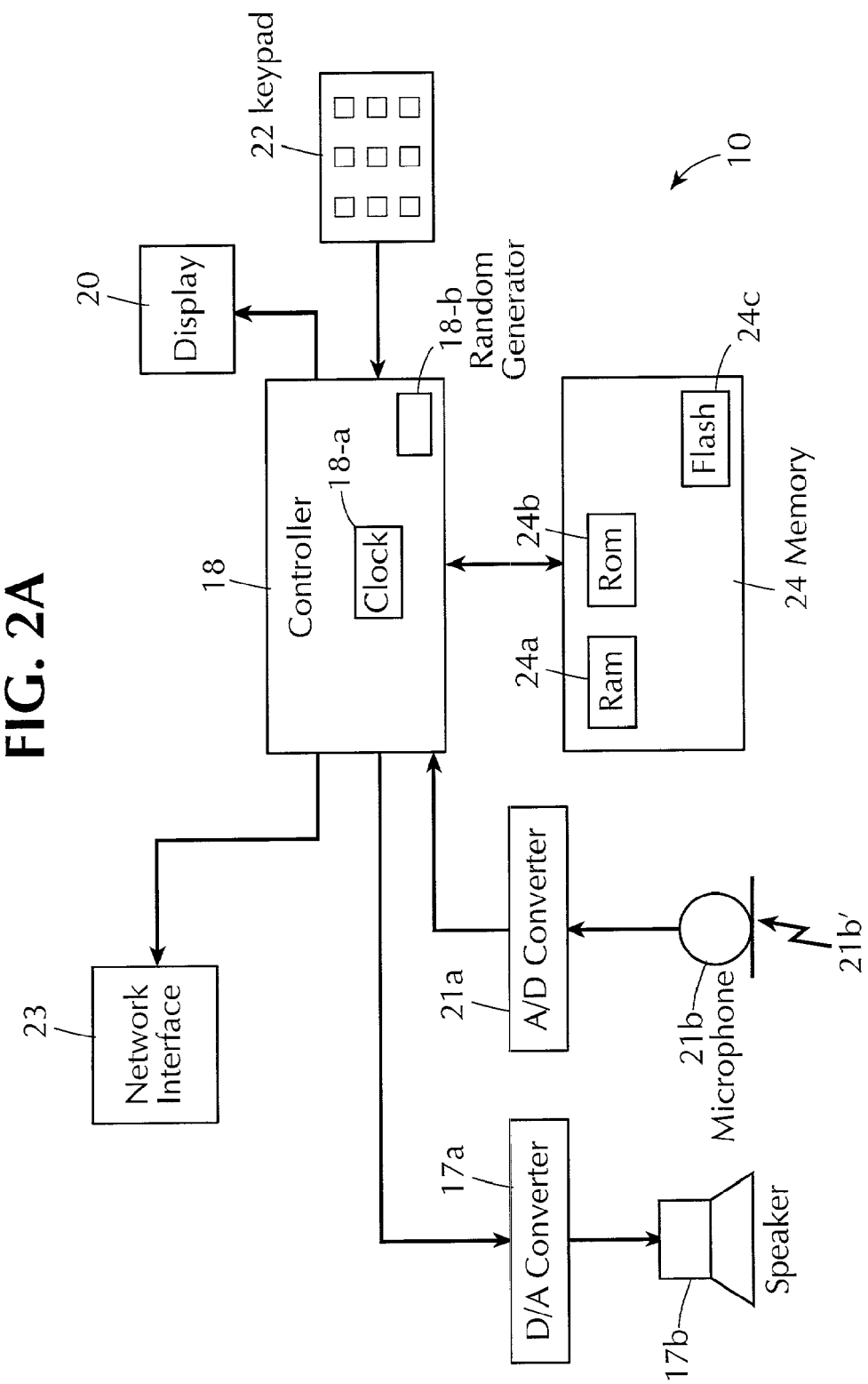
FIG. 2a is a block diagram of a user communication terminal of the system of FIG. 1, wherein the terminal is constructed and operated in accordance with this invention.

FIG. 1 is a block diagram of a communication system 1 that is suitable for practicing this invention. In the illustrated embodiment, the communication system 1 comprises a plurality of user communication terminals 18a, 18b and user information appliances 19a, 19b, hereinafter referred to collectively as "user communication devices", and a plurality of communication networks 32, 34 which are bidirectionally coupled to another communication network entity, such as the Internet 17. Traditionally, various types of interconnecting equipment may be employed for connecting the networks 32, 34 and user information appliances 19a, 19b (via respective interfaces 3a and 3b) to the Internet 17, such as, for example, gateways, optical fibers, wires, cables, switches, routers, modems (in the case of user information appliances 19a, 19b), and other types of communication equipment, as can be readily appreciated by one skilled in the art, although, for convenience, no such equipment is shown in FIG. 1. The networks 32, 34 are typically provided and maintained by an enterprise, such as a service provider SP1, SP2.

In the illustrated embodiment, the user communication terminal 18a is a radiotelephone that includes an antenna 18a' for transmitting signals to and receiving signals from a base site or base station 30 of the network 32, via an interface 19. Preferably, the interface 19 is a wireless interface, and the user communication terminal 18a is capable of operating in accordance with any suitable wireless communication protocol, such as IS-136, GSM, IS-95 (CDMA), wideband CDMA, narrow-band AMPS (NAMPS), and TACS. Dual or higher mode phones (e.g., digital/analog or TDMA/CDMA/analog phones) may also benefit from the teaching of this invention, and so called "Voice-Over-IP" technology, such as H.323 and SIP protocols, may also benefit as well. It should thus be clear that the user communication terminal 18a can be capable of operating with one or more air interface standards, communication protocols, modulation types, and access types, and that the teaching of this invention is not limited for use with any particular one of those standards/protocols, etc.

The network 32 preferably is a cellular network that includes the base station 30, a main switching office (MSO) 31 bidirectionally coupled between the base station 30 and the Internet 17, a database 33, and a server 33'. The MSO 31 controls the exchange of information between the user communication terminal 18a, the Internet 17, and other communication devices which may be connected to the MSO 31, such as Public Switched Telephone Network (PSTN) telephones (not shown). This information may include, for example, voice and data messages. The database 33 is bidirectionally coupled to the Internet 17 through the server 33', and is employed for storing various types of information, including information representing user-selected call alerting signals, as will be further described below.

The server 33' is a computer or farm of computers that facilitate the transmission, storage, and reception of information between different points, such as between the database 33 and the Internet 17. From a hardware standpoint, a server 33' typically includes one or more components, such as one or more microprocessors (not shown), for performing the arithmetic and/or logical operations required for program execution, and disk storage media, such as one or more disk drives (not shown) for program and data storage, and a random access memory, for temporary data and program instruction storage. From a software standpoint, a server 33' typically includes server software resident on the disk storage media, which, when executed, directs the server 33' in performing data transmission and reception functions. The server software runs on an operating system stored on the disk storage media, such as UNIX or Windows NT, and the operating system preferably adheres to TCP/IP protocols. Also, in a preferred embodiment, the server 33' is a Web or HTTP server, and the server software enables the server 33' to exchange information with client software (typically a browser) using the Hypertext Transfer Protocol. As is well known in the art, server computers are offered by a variety of hardware vendors, can run different operating systems, and can contain different types of server software, each type devoted to a different function, such as handling and managing data from a particular source, or transforming data from one format into another format. It should thus be clear that the teaching of this invention is not to be construed as being limited for use with any particular type of server computer, and that any other suitable type of device for facilitating the exchange and storage of information may be employed instead.

The network 34 will now be described. The network 34 preferably comprises a server 7', a database 7 which is bidirectionally coupled to the Internet 17 through the server 7', and a central office switching station (COSS) 8 which is bidirectionally coupled to both the Internet 17 and the user communication terminal 18b. An interface 9 couples the user communication terminal 18b to the COSS 8, and may include, for example, a telephone line (e.g., landline trunk) of a PSTN (not shown), one or more coaxial cable lines, a wireless interface, and/or modems (e.g., ADSL modems) and the like, depending on applicable performance criteria. The COSS 8 controls the exchange of information (voice and data messages) between the user communication terminal 18b, the Internet 17, and other communication devices which may be connected to the COSS 8, such as PSTN telephones (not shown).

Like the database 33 of network 32, the database 7 of network 34 stores information such as information representing user-selected call alerting signals, as will be described in greater detail below. The server 7' preferably is similar to the server 33' described above, and facilitates the transmission, storage, and reception of such information and other data, between points such as the database 7 and Internet 17.

The information stored in the databases 7, 33 will now be described in greater detail. In accordance with an aspect of this invention, each of the databases 7, 33 includes a plurality of sets of data tables, each of which sets corresponds to a particular user communication terminal 18a, 18b or information appliance 19a, 19b. An example of a set of data tables T1, T2 stored in an individual database 7, 33 is shown in FIGS. 2b and 2c, respectively. Data table T1 (i.e., a look-up table) preferably has a plurality of columns X and Y (FIG. 2b), each of which includes a respective plurality of memory locations or cells X1-Xn, Y1-Yn, for storing particular types of information. In a preferred embodiment each memory location X1-Xn of column X is employed for storing acoustic information, such as a sampled and digitized version of one or more audible signals. For example, memory location X1 may be employed for storing acoustic information which a party P1, P2 desires to be transmitted in a call signal to be sent from a device 18a, 18b, 19a, 19b to another, recipient device, for subsequent use in that recipient device for generating a corresponding audible signal indicating the receipt of the call signal. Also by example, memory locations X2-Xn each may be employed for storing acoustic information representing a digitized and sampled version of one or more audible signals which a party P1, P2 desires to be generated in his receiving device 18a, 18b, 19a, 19b when an incoming call signal is received from a particular calling source. It should be noted that the terms "audible signal" and "alerting signal" are hereinafter used interchangeably in this description, and the terms "acoustic information" and "audio sample(s)" also are used interchangeably in this description.

The memory locations Y1-Yn of column Y are associated with respective ones of the memory locations X1-Xn of column X, and each include information (also referred to as "communication device identifier information") which relates to a particular user communication device 18a, 18b, 19a, 19b and corresponds to the information included in the corresponding memory location X1-Xn. For example, the information included in each memory location Y1-Yn may specify one or more access codes of one or more user communication devices 18a, 18b, 19a, 19b, such as, for example, a device's telephone number, pager number, IP address, DNS domain name, and/or a public key certificate, etc., depending on the types of devices employed and applicable operating criteria.

Data table T2 (FIG. 2c) includes a plurality of memory locations Z1-Zn that are employed for storing information relating to particular communication devices 18a, 18b, 19a, 19b for which a receiving device will generate a call alerting signal based on acoustic information received from those devices. The manner in which information is stored in the data tables T1, T2 of databases 7, 33, and the manner in which that information is subsequently used in accordance with this invention for indicating the receipt of incoming calls in the devices 18a, 18b, 19a, 19h, will be described below in greater detail.

The Internet 17 will now be described. As used herein, the term "Internet" refers to an infrastructure having protocols and operating rules which effectively permit the creation of a world-wide "network of networks". By connecting a communication device, such as the devices 18a, 18b, 19a, 19b, to the Internet 17, information may be exchanged between those devices and any other source/destination device which also is connected to the Internet 17. Thus, a matrix of interconnected communication devices is provided for enabling information to be exchanged between those devices. In general, devices within the Internet, and devices connected to the Internet, adhere to TCP/IP protocols. Typically, gateways (not shown) and various other components which may interconnect the Internet 17 to external components, operate in accordance with TCP/IP protocols to form IP packets based on information (including, e.g., digitized acoustic signals) received from the external components, before routing those packets towards a particular destination, and also convert IP packets received from Internet 17 components back to their original form of information, before forwarding that information towards a particular destination. In general, routers (not shown) or other suitable types of switching/routing components are used for routing IP packets throughout the Internet 17, based on IP address information included in the information.

Figure 2B:
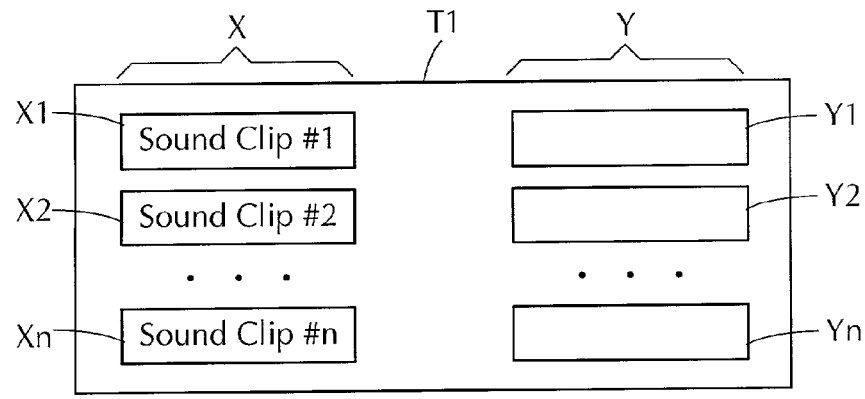
FIGS. 2b and 2c show data tables T1 and T2, respectively, that form a portion of a memory of one or more user communication devices of the system of FIG. 1.
Figure 2C:
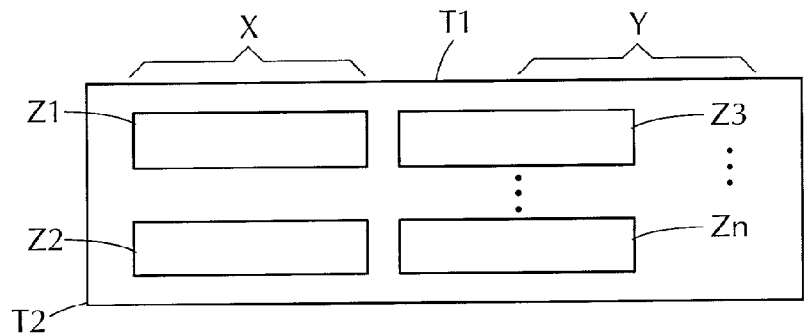

Referring now to FIG. 2a, a preferred embodiment of the individual user communication terminals 18a, 18b is shown, and is identified by reference numeral 10. The user communication terminal 10 includes an interface 23 for communicatively coupling the terminal 10 to an external communication interface, such as the interface 19 (FIG. 1), in the case of user communication terminal 18a, or the interface 9, in the case of user communication terminal 18b. For example, the interface 23 of FIG. 2a may include a transceiver and an antenna (in the case of terminal 18a) for enabling the terminal 10 to exchange information with the external interface. That information may include signaling information in accordance with the external interface standard employed by the respective network 32, 34 coupled to the terminal 10, user speech, and data.

A user interface of the terminal 10 includes a conventional speaker 17b, a display 20, a user input device, typically a keypad 22, and a transducer device, such as a microphone 21b, all of which are coupled to a controller 18 (CPU), although in other embodiments, other suitable types of user interfaces also may be employed. The keypad 22 includes the conventional numeric (0-9) and related keys (#, *), and other keys that are used for operating the user communication terminal 10, such as a SEND key (terminal 18a), various menu scrolling and soft keys, etc. A digital-to-analog (D/A) converter 17a is interposed between an output of the speaker 17b and the controller 18. The D/A converter 17a converts digital information signals received from the controller 18 into corresponding analog signals, and forwards those analog signals to the speaker 17b, for causing the speaker 17b to output a corresponding audible signal. An analog to digital (A/D) converter 21a is interposed between an output of the microphone 21b and an input of the controller 18, and operates by repetitively sampling and then digitizing analog signals received from the microphone 21b, and by providing acoustic information representing the resulting digital values to the controller 18. In one embodiment of the invention, a clock or timer 18-a is included in the controller 18.

The user communication terminal 10 also includes various memories, such as a RAM 24a, a ROM 24b, and a Flash memory 24c, shown collectively as the memory 24. In accordance with one embodiment of this invention, the memory 24 also includes a data table T1 as shown in FIG. 2a described above, and a data table T2 as shown in FIG. 2b described above, wherein the individual tables T1, T2 preferably are included in the Flash memory 24c of the terminal 10. As will be described in more detail below, and in accordance with an embodiment of this invention, the information included in the data tables T1, T2 of memory 24 is synchronized with information stored in corresponding data table T1, T2 of a corresponding one of the databases 7 (in the case of terminal 18b) and 33 (in the case of terminal 18a).

An operating program for controlling the operation of controller 18 also is stored in the memory 24 (typically in ROM 24b) of the user communication terminal 10, and may include routines to present messages and message-related functions to the user on the display 20, typically as various menu items. The operating program stored in memory 24 also includes routines for implementing a method that enables the user to enter or otherwise manipulate information in the data tables T1, T2 of the databases 7, 33 and user communication terminals 18a, 18b, in accordance with a memory programming mode of this invention, and routines for implementing a method that enables stored acoustic information to be employed for generating audible alerting signals indicating the receipt of incoming calls at receiving devices. Those methods will be described below in relation to FIGS. 3a-3c, 4a, 4b, and 5. In accordance with one embodiment of the invention, at least one program stored in memory 24 adheres to TCP/IP protocols, for implementing a known method for connecting the terminal 10 to the Internet 17. The memory 24 preferably also stores software (e.g., web browser software) for enabling a user to navigate or otherwise exchange information with the World Wide Web, using interface 22.

Figure 2D:
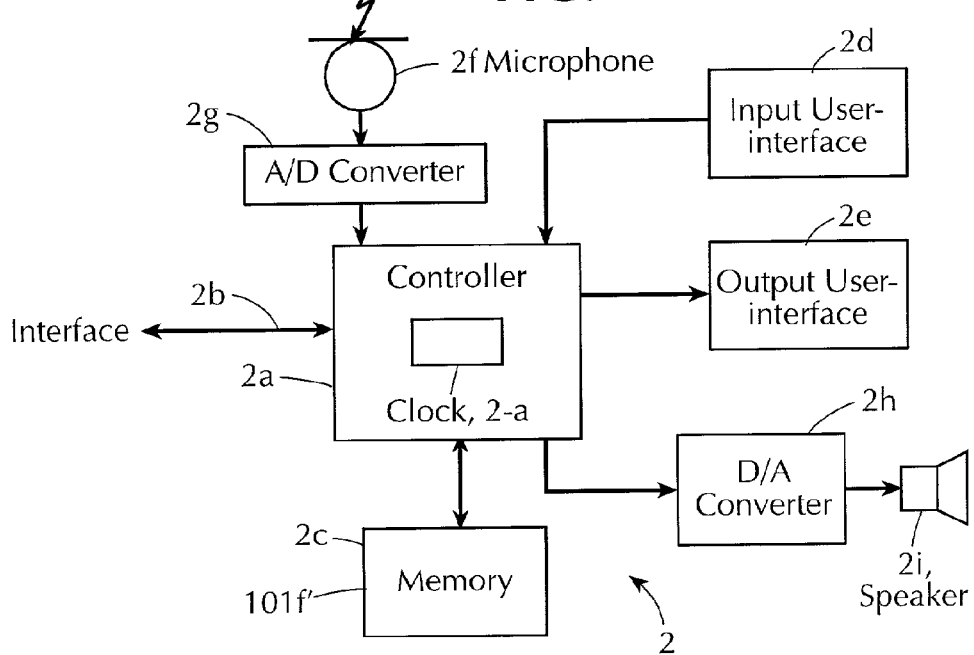
FIG. 2d is a block diagram of a user information appliance of the system of FIG. 1, wherein the appliance is constructed and operated in accordance with this invention.

Referring now to FIG. 2d, an exemplary embodiment of the individual user information appliances 19a, 19b is shown, and is identified by reference numeral 2. The user information appliance 2 preferably comprises a controller (e.g., a microprocessor and/or logic array) 2a for performing arithmetic and/or logical operations required for program execution, an input user-interface 2d coupled to the controller 2a, an output user-interface 2e coupled to the controller 2a, and, according to one embodiment, a microphone 2f coupled to an input of the controller 2a through an A/D converter 2g, and a speaker 2i coupled to an output of the controller 2a through a D/A converter 2h. An interface 2b couples the controller 2a bidirectionally to an external interface, such as the interface 3a, in the case of user information appliance 19a, or the interface 3b, in the case of user information appliance 19b, and is used by the controller 2a to communicate bidirectionally with that external interface.

The input user-interface 2d may include any suitable type of user-operable input device(s), such as, for example, a keyboard, mouse, touch screen, or trackball, and the output user-interface 2e may include, for example, a video display, a liquid crystal or other flat panel display, a printer, and/or any other suitable type of output device for enabling a user to perceive outputted information. For the purposes of this description, the output user-interface 2e is assumed to be a display.

The user information appliance 2 of FIG. 2d also includes at least one memory (e.g., disk drives, read-only memories, and/or random access memories) 2c that is bidirectionally coupled to the controller 2a. The memory 2c stores temporary data and instructions, and also stores various routines and operating programs (e.g., Microsoft Windows, UNIX/LINUX, or OS/2) that are used by the controller 2a for controlling the overall operation of the user information appliance 2. Preferably, at least one of those programs (e.g., Microsoft Winsock) stored in memory 2c adheres to TCP/IP protocols (i.e., includes a TCP/IP stack), for implementing a known method for connecting the appliance 2 to the Internet 17, through the respective external interface 3a or 3b of the system 1. The memory 2c preferably also stores web browser software, such as, for example, Microsoft Internet Explorer (IE) and/or Netscape Navigator, for enabling a user of the appliance 2 to navigate or otherwise exchange information with the World Wide Web (WWW), using user interface 2d. In accordance with one embodiment of the invention, the memory 2c may also stores software, such as, for example, Microsoft NetMeeting, that implements protocols (e.g., H.323, SIP, and/or RTP) for enabling the appliance 2 to send and receive phone calls through the Internet 17, while connected thereto. The memory 2c also may store data tables T1, T2 having information as shown in FIGS. 2b and 2c, respectively, for use in accordance with this invention to indicate the receipt of call signals sent to, or received by, the information appliance 2. Routines for implementing methods according to this invention also are stored in the memory 2c. Those methods will be described below in relation to FIGS. 3a-3c, 4a, 4b, and 5.

Before describing the various methods of the invention, it should be noted that the total number and variety of user communication terminals and user information appliances which may be included in the overall communication system 1 can vary widely, depending on user support requirements, geographic locations, applicable design/system operating criteria, etc., and are not limited to those depicted in FIG. 1. Also, this invention may be employed in conjunction with any suitable types of communication protocols, including, but not limited to, for example, Internet telephony protocols, ATM telephony protocols, GSM cellular telephony protocols, and ANSI ISUP. Moreover, although in FIG. 1 the user communication terminals 18a, 18b are depicted as a radiotelephone and a conventional, non-wireless telephone, respectively, and the user information appliances 19a, 19b are depicted as PCs, any other suitable types of user communication terminals and/or information appliances may be employed, in addition to, or in lieu of, those components. For example, in other embodiments, and where appropriate, one or more of the individual devices 18a, 18b, 19a, 19b may be embodied as a personal digital assistant, a handheld personal digital assistant, a palmtop computer, a pager, and the like. It also should be noted that, although the invention is described in the context of the various devices 18a, 18b, 19a, 19b communicating with other components through the Internet 17 and networks 32, 34, broadly construed, the invention is not so limited. For example, one or more of the user communication devices 18a, 18b, 19a, 19b may communicate with one another through other suitable interfaces, and/or may be included within a same network. In general, the teaching of this invention may be employed in conjunction with any suitable types of communication devices that are capable of communicating with another communication device, and which include a user interface for enabling a user to input information and perceive outputted information. It should thus be clear that the teaching of this invention is not to be construed as being limited for use with any particular type of user communication terminal, user information appliance, or communication protocol.

It also should be noted that although the invention is described in the context of the servers 7' and 33' being included in the networks 34 and 32, respectively, the invention is not necessarily limited to that configuration. For example, in other embodiments those devices 7' and 33' may be connected within other suitable locations of the communication system 1, such as within the Internet 17. In other embodiments, no servers 7', 33' need be employed at all in cases where other suitable components are employed for facilitating the transfer and storage of information to and from the databases 7, 33.

Having described the various components of the communication system 1, an aspect of this invention will now be described, with reference to the flow diagram of FIGS. 3a and 3b. In accordance with this aspect of the invention, a party P1, P2 can select one or more audible alerting signals (e.g., sounds) which he desires to be used for indicating the receipt of an incoming call at a particular communication device 18a, 18b, 19a, 19b. Acoustic information representing a digital version of those audible signals preferably can be stored by the party P1, P2 in one or more desired devices 18a, 19a, 33, 18b, 19b, 7, along with corresponding communication device identifier information, using various techniques of this invention.

Figure 3A:
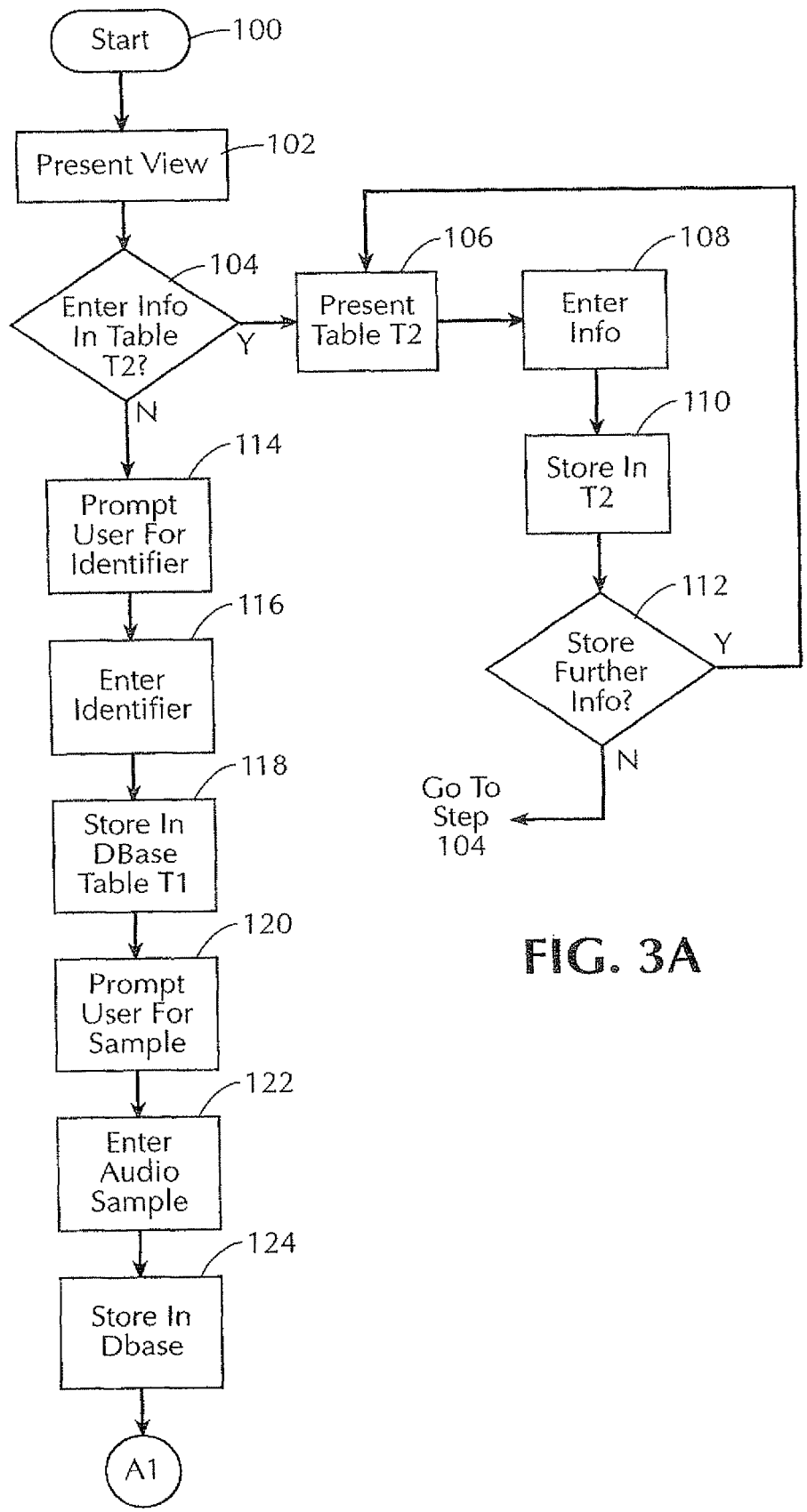
FIGS. 3a and 3b are a logical flow diagram of a method for enabling a user to select a type of alerting signal which he desires to be employed at a receiving communication device when an incoming call signal is received at the device, in accordance with this invention.

In step 100 of FIG. 3a, the method is started, and it is assumed that the user information appliance 19a is "connected" to the Internet 17 through the interface 3a. For example, the user information appliance 19a may connect to the Internet 17 in response to party P1 causing a predetermined icon presented on display 2e of the appliance 19a to be selected, in which case one of the above-described programs stored in memory 2c of the appliance 19a responds by communicating through the interface 3a to connect the appliance 19a with the Internet 17, in accordance with TCP/IP protocols.

In step 102, it is assumed that the party P1 desires to store information in at least one of the data tables T1, T2 (from database 33) corresponding to user communication terminal 18a, and thus operates the user interface 2d to cause a predetermined view (not shown) to be presented on the display 2e. Preferably, that predetermined view is a web page retrieved from the database 33. For example, step 102 may be performed by the party P1 operating the interface 2d to cause predetermined software (e.g., web browser software) stored in the memory 2c to communicate through the interface 3a and Internet 17 with the server 33', and to cause that server 33' to retrieve the predetermined web page from the database 33, although in other embodiments, other suitable techniques for accessing desired information from the database 33 may also be employed. Also, in one embodiment the predetermined web page may be dedicated specifically to the user communication terminal 18a by the service provider SP1, and may require the party P1 to enter a predetermined password (e.g., a telephone number of terminal 18a), before granting that party P1 access to the data tables T1, T2 of database 33, using a known technique.

Preferably, the predetermined view presented to the party P1 in step 102 prompts the party P1 to specify whether or not he desires to obtain access to one of the data tables T1, T2 (from database 33) corresponding to user communication terminal 18a, for entering or otherwise manipulating information stored in that table. For the purposes of this description, it is assumed that the party P1 desires to store communication device identifier information in table T2 of database 33, to identify communication device(s) for which he authorizes the terminal 18a to generate audible alerting signals based on acoustic information received from those devices. Accordingly, the party P1 responds to the prompt by entering information into user interface 2d specifying that he desires to obtain access to data table T2 ("Y" in step 104). As a result, control then passes to step 106 where the data table T2 is accessed from the database 33, and a view of the table T2 is presented to the party P1 via the display 2e of the user information appliance 19a.

Thereafter, in step 108 it is assumed that the party P1 enters information, such as, e.g., a telephone number of user communication terminal 18b, through the user interface 2d of user information appliance 19a (although, as previously described, other information may also be entered, such as an IP address, DNS domain name, a public key certificate, etc., corresponding to a desired user communication device). In response to the information being entered in step 108, software employed by the controller 2a communicates the entered information to the server 33' which then stores the information in a predetermined memory location, such as memory location Z1, of table T2 in the database 33 (step 110).

Thereafter, in step 112, a message is presented to the party P1 via display 2e, prompting the party P1 to specify whether or not he desires to store or otherwise manipulate further information in the table T2 of database 33. If the party P1 responds by entering information into the user interface 2d specifying that he does not desire to do so ("N" in step 112), then control passes back to step 104 where the method proceeds in the above-described manner. Otherwise, if the party P1 specifies that he does desire to store or otherwise manipulate further information in the data table T2 ("Y" in step 112), then control passes back to step 106 where the method then continues in the above-described manner.

Referring again to step 104, it now is assumed that the party P1 desires to store (in data table T1 of database 33) acoustic information which he desires to be employed by the user communication terminal 18a to generate audible signal(s) for indicating the receipt of incoming calls from a particular source communication device, and thus enters information into the user interface 2d specifying that he desires access to the data table T1 ("N" in step 104). As a result, control passes to step 114 where a message is presented on the display 2e prompting the party P1 to enter predetermined information (e.g., a telephone number) into the appliance 19a for identifying the source communication device. Assuming that the party P1 then enters information, such as a telephone number of user communication terminal 18b, into the interface 2d of the appliance 19a (step 116), then the entered information is communicated to the database 33 and stored in a predetermined memory location, such as memory location X1 of data table T1 (step 118).

Thereafter, control passes to step 120 where a message is presented on the display 2e prompting the party P1 to input one or more sounds which he desires to be used by user communication terminal 18a to indicate the receipt of incoming calls sent from the source device identified by the information entered in step 116. Thereafter, it is assumed that the party P1 then responds by entering a desired audible signal (sound wave) 2f' (FIG. 2d) into the information entered in step 116. Thereafter, it is assumed that the party P1 then responds by entering a desired audible signal (sound wave) 2f' (FIG. 2d) into the information appliance 19a (step 122). For example, the party P1 may enter the signal 2f' by speaking into the microphone 2f, or by causing acoustic waves generated by an external source to be entered into the microphone 2f. In either case the entered signal is repetitively sampled and converted to digital form by the A/D converter 2g, and resulting digital acoustic information representing a digital version of the entered signal is provided to the controller 2a. As another example, the party P1 may connect an external audio source to an interface (e.g., a port) of the appliance 19a, and then cause acoustic information to be downloaded from that source directly into the controller 2a of the appliance 19a. As a further example, instead of inputting an externally-derived acoustic wave in the above-described manner, the party P1 may desire to employ an acoustic sample already stored in the memory 2c of the appliance 19a. For example, that acoustic sample may have been downloaded to the appliance's memory 2c from a particular web site accessed by the party P1, while previously navigating the world-wide-web (in a known responds by retrieving that sample (acoustic information) from the memory 2c.

In response to step 122 being performed, the controller 2a of the information appliance 19a communicates the acoustic information obtained in step 120, to the server 33', which in turn, causes the acoustic information to be stored in, for example, memory location Y1 in the table T1 of database 33 (step 124).

Figure 3B:
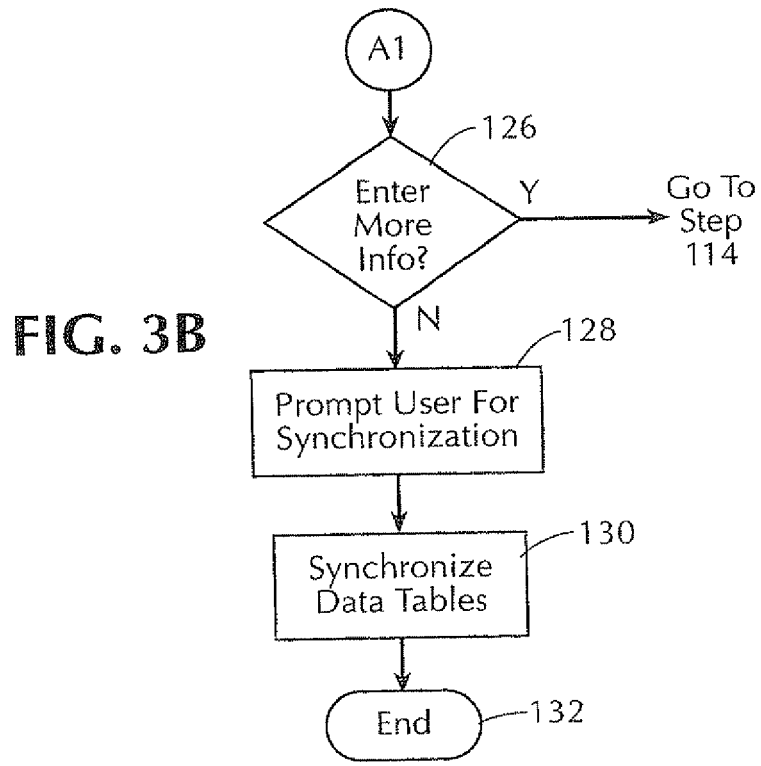
Figure 3C:
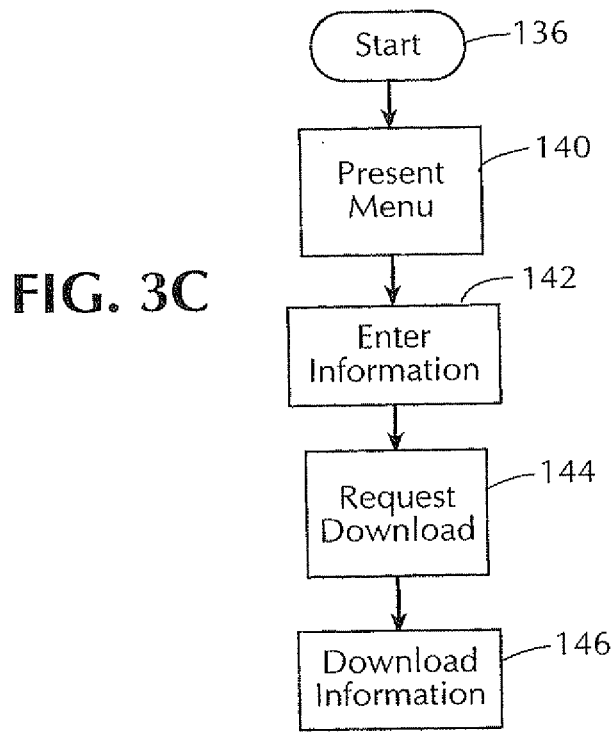
FIG. 3c is a logical flow diagram of a procedure executed during the performance of the method of FIGS. 3a and 3b, according to another embodiment of this invention.

Thereafter, control passes through connector (A1) to step 126 of FIG. 3b, where a message is presented on the display 2e of information appliance 19a prompting the party P1 to specify whether or not he desires to store further acoustic information in the data table T1 of database 33. If the party P1 then responds by entering information into the information appliance 19a specifying that he does desire to store further acoustic information in the data table T2 ("Y" in step 126), then control passes back to step 114 of FIG. 3a, where the method then proceeds in the above-described manner. If the party P1 specifies otherwise ("N" in step 126), then, according to one embodiment of the invention, control passes to step 128 where another message is presented on the display 2e, this time prompting the party P1 to specify whether or not he desires to have the information from the data tables T1 and T2 of database 33 copied to the corresponding data tables T1 and T2 of the memory 24 of user communication terminal 18a (i.e., for synchronized the tables T1, T2 of those devices 33 and 18a together). Assuming that the party P1 then enters information into the information appliance 19a instructing that the tables T1, T2 in the devices 18a and 33 be synchronized, and also assuming that the communication terminal 18a is connected to the Internet 17 (by way of interface 19 and components 30 and 31), then the controller 2a of user information appliance 19a communicates in the above-described manner with the server 33' to cause the information from the data tables T1, T2 of database 33 to be copied, downloaded to the user communication terminal 18a (via intermediate components 17, 31, 30, and 19), and stored in the corresponding data tables T1, T2 within the memory 24 of the user communication terminal 18a (step 130). For example, the copied information may be forwarded by the components 33, 17, and 31 to the terminal 18a, based on information defining the telephone number of that terminal 18a, entered into the appliance 19a by party P1 when instructing that the synchronization process be performed in step 130. In the foregoing manner, the information included in the data tables T1, T2 of the memory 24 is synchronized with (i.e., replicated) that from the corresponding tables T1, T2 from database 33. Thereafter, control passes to step 132 where the method is terminated.

It should be noted that in other embodiments of the invention, other suitable techniques also may be employed for synchronizing the communication terminal memory 24 with the database 33, either in lieu of, or in addition to, that described above. For example, in accordance in another embodiment of this invention, the controller 2a of user information appliance 19a periodically (i.e., at predetermined time intervals, determined by clock 2-a) communicates with the server 33' in the above-described manner to cause the information to be copied from the database 33 tables T1, T2 to the memory 24 of user communication terminal 18a, while the information appliance 19a and terminal 18a are both connected to the Internet 17.

In another embodiment of the invention, the controller 18 of the user communication terminal 18a periodically (i.e., at predetermined time intervals determined by clock 18-a) communicates with the server 33' (through the intermediate components 19, 30, 31, and 17) while registered with the network 32 and connected to the Internet 17, to cause the information to be copied from the database 33 tables T1, T2 to the terminal memory 24 in the above-described manner.

In still another embodiment of the invention, the synchronization process is performed in response to a party, such as party P1, entering a command into the user communication terminal 18a, specifying that the synchronization process be performed. As an example of this embodiment, and referring to FIG. 3c, it is assumed that, while the user communication terminal 18a is both registered with the network 32 and connected to the Internet 17 (step 136), the party P1 operates the keypad 22 of the terminal 18a to cause a predetermined menu to be presented on the display 20 (step 140). Preferably, the predetermined menu prompts the party P1 to specify whether he wishes to initiate the synchronization procedure. For example, that menu may include a message reading "Would you like to download sound samples?". Assuming that the party P1 then responds by entering information into the keypad 22 specifying "Yes" (step 142), then the controller 18 of terminal 18a responds by communicating, to the server 33', information requesting a download of the information from the tables T1, T2 of database 33, by way of the intermediate components 19, 30, 31, and 17 (step 144). The server 33' then responds to receiving that request by causing the information to be copied from the data tables T1, T2 of database 33 to the corresponding data tables T1, T2 within the terminal memory 24, in the above-described manner (step 146).

As another example, the menu presented on the terminal display 20 in step 140 may include a message reading "Would you like to listen to pre-set sound samples?" In this case, assuming that the party P1 then responds by entering information into the keypad 22 specifying "Yes" in step 142, then the controller 18 of terminal 18a responds by communicating with the database 33 through the server 33', in accordance with, for example, web browser software stored in memory 24, to cause a predetermined view to be presented on the display 20 of terminal 18a. Preferably, that predetermined view is a web page retrieved from database 33, presenting various filenames corresponding to pre-stored audio samples in the database 33. That predetermined view preferably also presents the party P1 with an option (preferably as a list of filenames) to select (through interface 22) one or more audio samples which he desires to listen to. Assuming that the party P1 selects a particular displayed filename, then the corresponding sound sample is retrieved from database 33 (step 144) and downloaded to the terminal 18a (step 146), wherein it is converted to an analog signal by the D/A converter 17a and then outputted in audible form by the speaker 17b. The predetermined view presented in step 140 preferably also prompts the party P1 to select one or more of the audio samples which he desires to be downloaded and stored in the memory 24 of terminal 18a. For example, the view may include a message such as "Please select desired sound samples". Assuming that in step 142 the party P1 interacts with the presented view through the user interface 2d to respond to that message by selecting one or more filenames corresponding to audio samples which he desires to be downloaded, then in step 144 the controller 18 communicates with the database 33 through server 33', in the above-described manner, to cause the corresponding audio sample(s) to be retrieved from the table T1 of database 33 and downloaded to the terminal 18a (step 146), wherein those sample are then stored in predetermined memory locations X1-Xn of table T1 within memory 24.

For either of the foregoing examples, and in cases in which the party P1 operates the terminal 18a in step 142 to initiate the synchronization procedure while the user communication terminal 18a is not connected to the Internet 17, as recognized by the controller 18 based on predetermined information (e.g., either Internet-level information, such as PPP status information or the presence or absence of IP address information, or lower level status information, such as modem status information) then the controller 18 responds by operating in accordance with a program stored in memory 24 to connect the terminal 18b to the Internet 17 (through components 19, 30, and 31), in accordance with, for example, TCP/IP protocols. Thereafter, in response to recognizing that the user communication terminal 18a is connected to the Internet 17, the controller 18 communicates with the server 33' in step 144 as described above to cause the information from data tables T1, T2 in database 33 to be automatically copied to the corresponding data tables T1, T2 in the terminal memory 24 in step 146.

In accordance with another embodiment of this invention, acoustic information and communication device identifier information may be provided in the data tables T1, T2 of the individual databases 7, 33 by the corresponding service providers SP1, SP2, and the service provider SP1, SP2 may or may not permit the communication devices 18a, 18b, 19a, 19b to have access to that information. For example, the service provider SP1 (perhaps at the request of party P1) may pre-assign predetermined audio samples to predetermined user communication devices 18a, 18b, 19a, 19b, and then store those audio samples in respective ones of the memory locations X1-Xn of table T1 in database 33, along with communication device identifier information identifying those devices in corresponding memory locations Y1-Yn of table T1. The service provider SP1 also may provide the information within data table T2 of the database 33. In addition, the service provider SP1 may elect to periodically change the information (e.g., the audio samples) included in any of the memory locations of one or both of the data tables T1, T2 in database 33. For either case, any of the above-described techniques for synchronizing the data tables T1, T2 of memory 24 of communication terminal 12a with those of the database 33 may be employed, after the information is provided in the database 33 by the service provider SP1, SP2.

It should be noted that any party, such the user of terminal 18a, or other users (e.g., such as acquaintances of the user of terminal 18a), may initiate the above-described techniques for causing acoustic information to be stored in the terminal 18a, depending on applicable performance criteria, and those storage procedures may be initiated from any one of the devices 18a, 19a, 19b, or 18b. In cases where a user of a device 19a, 18b, or 19b initiates one of those procedures (for causing the acoustic information to be stored in terminal 18a), any suitable type of authorization procedures also may be employed (e.g., such as requiring the party to specify a password for the terminal 18a and/or database 33) before permitting a party to access to the device 18a and/or 33.

It also should be noted that while the invention has been described above in the context of the acoustic information and communication device identifier information being downloaded to the communication terminal 18a from the network 32, other suitable techniques also may be employed for storing the information in the user communication terminal 18a. For example, where appropriate, sound waves representing desired sounds may be applied to the microphone 21b of the terminal 18a, in which case analog signals outputted by the microphone 21b are sampled and converted to digital form by the A/D converter 21a, and then stored in the memory 24 as acoustic information by the controller 18. As another example, acoustic information may be downloaded from an external source coupled to an interface (e.g., a port) of the terminal 18a, in which case the controller 18 responds by storing that information in the memory 24 of terminal 18a. These entry procedures, as well as procedures for entering corresponding communication device identifier information, may be performed by the party P1 while, for example, scrolling through and interacting with various menus and prompts presented on display 20, wherein those prompts are preferably similar to those described above with respect to steps 102, 112, 114, and 120. Also by example, the acoustic information sample may be downloaded to the terminal 18a from a particular web site, in a similar manner as described above. The steps which are performed by the terminal 18a for storing entered information preferably are similar to those described above with regard to the information appliance 19a, as modified for the terminal 18a in a manner as would be readily appreciated by one skilled in the art in view of this description.

Having described the various techniques of the invention for storing acoustic and communication device identifier information in the databases 7, 33 and user communication devices 18a, 18b, 19a, 19b, another aspect of this invention will now be described. In accordance with this aspect of the invention, stored acoustic information is employed for generating audible signals indicating the receipt of incoming calls signal at recipient communication devices 18a, 18b, 19a, 19b. A method in accordance with this aspect of the invention will now be described, with reference to FIGS. 4a and 4b.

Figure 4A:
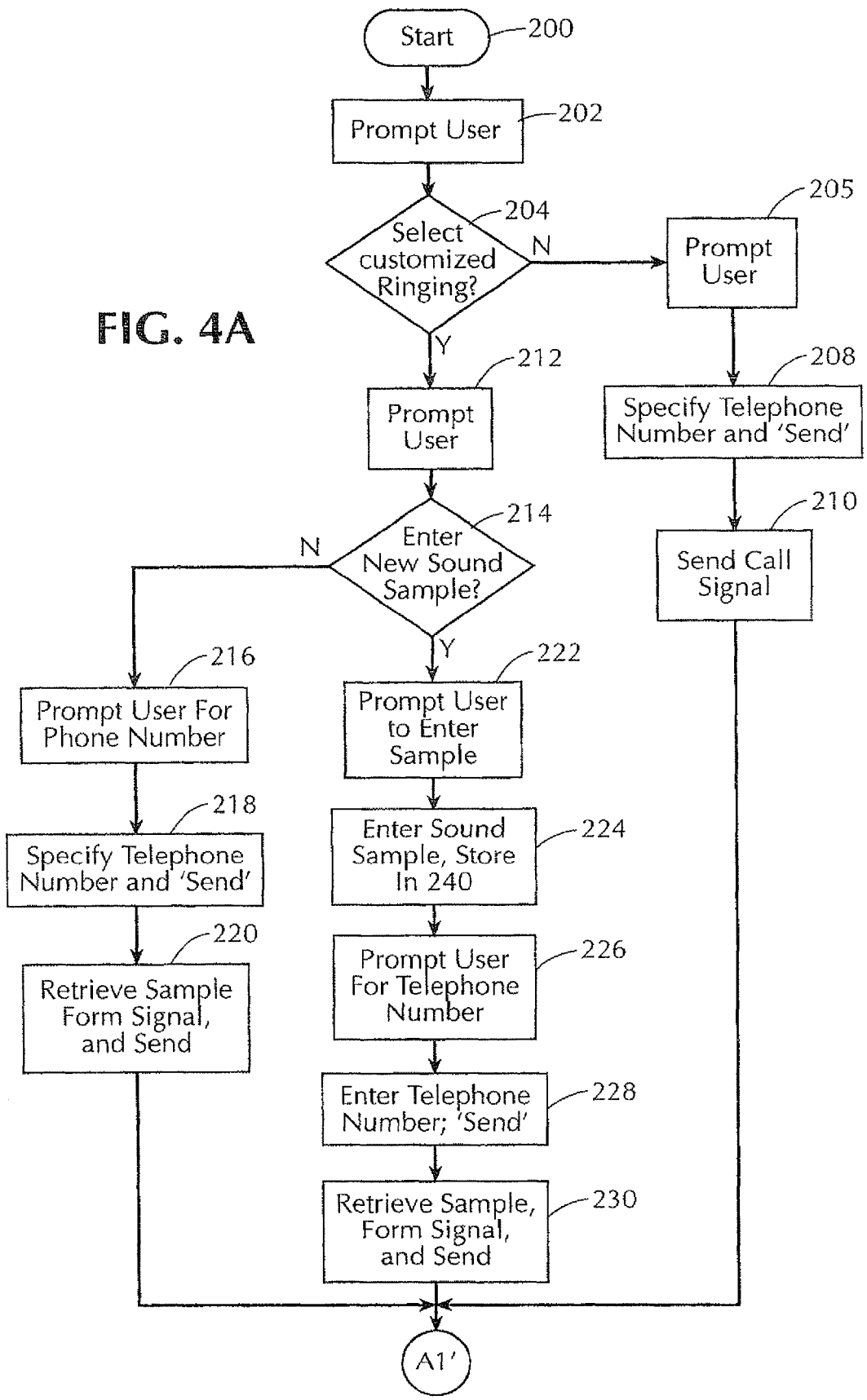
FIGS. 4a and 4b are a logical flow diagram of another method in accordance with this invention, wherein the portion of the method shown in FIG. 4b enables an alerting signal selected by a user during the performance of the method of FIG. 3a, 3b, or 4a, to be generated at a receiving communication device when an incoming call signal is received at that device.

In step 200 of FIG. 4a the method is started, and it is assumed that a party, such as party P2, operates one of the user communication devices, such as terminal 18b, to cause the terminal 18b to enter a telephone call origination mode in which a predetermined menu is presented on the display 20 (step 202). The predetermined menu preferably prompts the party P2 to specify whether or not he desires to place a telephone call to another, recipient communication device, and if so, whether or not he desires that the recipient device indicate the receipt of the call signal by sounding an audible alerting signal selected by the party P2. By example, the user communication terminal 18b may prompt the party P2 in step 202 by presenting a message on the display 20 reading "send call with customized ringing?".

Assuming that party P2 then operates the keypad 22 of terminal 18b to enter information into the controller 18 specifying that the call be placed without implementing customized ringing ("N" in step 204), then control passes to step 206 where the terminal 18b presents a message on the display 20 of that terminal 18b prompting the party P2 to specify an access code (e.g., a telephone number) of a communication device to which he desires to place a call. Assuming that the party P2 then operates the keypad 22 to enter information into the terminal 18b specifying a telephone number of a desired recipient communication device, such as user communication terminal 18a, and also enters information into the terminal 18b (e.g., by depressing a "SEND" key) specifying that a call be placed to that recipient communication terminal 18a (step 208), then the controller 18 responds by causing a call signal to be transmitted to the terminal 18a, by way of the network interface 23 of terminal 18b and the components 9, 8, 17, 31, 30, and 19 of the communication system 1 (step 210), in a conventional manner. Preferably, the call signal includes both the telephone number information entered in previous step 208 and information (e.g., telephone number) identifying the calling terminal 18b. Thereafter, control passes through connector (A1') to step 232 of FIG. 4b, where the method then continues in a manner as will be described below.

Referring again to step 204, assuming that the party P2 operates the keypad 22 to enter information into the controller 18 specifying that the customized ringing option be implemented ("Y" in step 204), then control passes to step 212 where the terminal 18b presents a message on the display 20 of that terminal 18b prompting the party P2 to specify whether he desires to enter one or more desired sounds into the terminal 18b, for being included in digital form in a call signal to be transmitted to a desired recipient device, or whether he desires that pre-stored acoustic information be included in that call signal.

If the party P2 then enters information (through the keypad 22) specifying that pre-stored acoustic information be included in the call signal ("N" in step 214), then control passes to step 216 where the terminal 18b presents a message on the display 20 prompting the party P2 to specify the telephone number of a recipient communication device to which he desires to place a call. Assuming that the party P2 then operates the keypad 22 to enter information into the terminal 18b specifying the telephone number of user communication terminal 18a, and also enters information into the terminal 18b (e.g., by depressing the "SEND" key) specifying that a call be placed to that terminal 18a (step 218), then, in accordance with one embodiment of the invention, the controller 18 responds by referring to a memory location Y1-Yn (in data table T1 of the memory 24) that includes information (e.g., a telephone number) identifying the terminal 18b, correlating that memory location to a corresponding memory location X1-X1 in the table T1 of memory 24, and by retrieving the acoustic information stored in that memory location X1-Xn. The controller 18 then forms a call signal that includes that retrieved acoustic information and the telephone numbers of terminals 18a and 18b within predetermined information fields of the signal, and by causing the formed call signal to be transmitted to the terminal 18a, by way of the interface 23 (FIG. 2a) and the components 9, 8, 17, 31, 30, and 19 of the communication system 1 (step 220).

After the call signal is transmitted from the terminal 18b in step 220, control passes through connector (A') to step 232 of FIG. 4b, where the method continues in a manner as will be described below.

According to another embodiment of this invention, step 220 is performed in the following manner. In response to the party P2 specifying in step 218 that a call be placed to the recipient terminal 18a, the controller 18 operates by 1) forming a call signal that includes the telephone numbers of the respective terminals 18a, 18b and request information requesting the retrieval of acoustic information from the database 7, and 2) by causing the formed call signal to be forwarded towards the terminal 18a by way of the system components 9, 8, and 17. Thereafter, the call signal is routed by the Internet 17 to the server 7', based on the request information included in the signal, and the server 7' then responds to the received signal by 1) correlating the telephone number of terminal 18b from the call signal to corresponding information in a memory location Y1-Yn of data table T1 within database 7, 2) correlating that memory location Y1-Yn to a corresponding memory location X1-X1 in the data table T1 of database 7, and 3) retrieving the acoustic information stored in that location X1-Xn. The server 7' then inserts the retrieved acoustic information into another predetermined field of the call signal, and, based on the telephone number of terminal 18a included in the signal, forwards the signal to the terminal 18a by way of the system components 17, 31, 30, and 19. Control then passes through connector (A1') to step 232 of FIG. 4b, where the method then continues in a manner as will be described below.

In still another embodiment of this invention, step 220 may be performed by retrieving acoustic information from the database 33. For example, in this embodiment, the controller 18 responds to the party P2 specifying (in step 218) that a call be placed to recipient terminal 18a by 1) forming a call signal that includes the telephone numbers of the respective terminals 18a, 18b and request information requesting the retrieval of acoustic information from the database 33, and 2) causing the formed call signal to be forwarded towards the terminal 18a by way of the system components 9, 8, and 17. Thereafter, the call signal is routed by the Internet 17 to the MSO 31, which, based on the request information included in the signal, communicates with the server 33' to cause the server 33' to 1) correlate the telephone number of terminal 18b from the call signal to corresponding information in a memory location Y1-Yn of data table T1 of database 33, 2) correlate that memory location to a corresponding memory location X1-X1 in table T1 of database 33, 3) retrieve the acoustic information from that location X1-Xn, and 4) provide the retrieved information back to the MSO 31. The MSO 31 then inserts the retrieved acoustic information into another predetermined field of the call signal, and, based on the telephone number of terminal 18a included in the signal, forwards the signal to the terminal 18a by way of the system components 17, 31, 30, and 19. Control then passes through connector (A1') to step 232 of FIG. 4b, where the method then continues in a manner as will be described below.

Referring again to step 214, a case in which the party P2 wishes to enter one or more desired sounds into the terminal 18b before placing a call will now be described. If, in response to the prompt in step 212, the party P2 enters information into the controller 18 (through keypad 22) specifying that he wishes to enter one or more desired sounds into the terminal 18b, for being included in digital form in a call signal to be transmitted to recipient terminal 18a ("Y" in step 214), then control passes to step 222 where the terminal 18b presents another message on the display 20 prompting the party P2 to enter the sound(s) into the terminal 18b. Thereafter, the party P2 may enter the desired sounds or digital acoustic information into the terminal 18b, using any of the techniques described above. For the purposes of this description only, it is assumed that the party P2 responds to the message by applying an audible signal 21b' to the microphone 21b of terminal lab. In this case the microphone 21b then outputs a corresponding analog signal, which is then converted to digital acoustic information by the A/D converter 21a. That acoustic information then is provided to the controller 18, which, in turn, stores the acoustic information in a predetermined memory location, such as location X1, within the table T1 of memory 24 (step 224).

After the step 224 is performed, control passes to block 226 where the terminal 18b presents another message on the display 20 prompting the party P2 to specify a telephone number of a communication device to which he desires to place a call. Assuming that the party then operates the keypad 22 to enter information into the terminal 18b specifying the telephone number of terminal 18a, and also enters information into the terminal 18b (e.g., by depressing the "SEND" key) specifying that a call be placed to that terminal 18b (step 228), then the controller 18 responds by retrieving the acoustic information stored earlier in the memory 24 in previous step 224, forming a call signal that includes that acoustic information within a predetermined information field of the signal, and by causing the formed call signal to be transmitted to the terminal 18a, by way of the components 9, 8, 17, 31, 30, and 19 of the communication system 1 (step 230). After the call signal is transmitted from the terminal 18b in step 230, control passes to through connector (A1') to step 232 of FIG. 4b, where the method then continues therefrom.

Figure 4B:
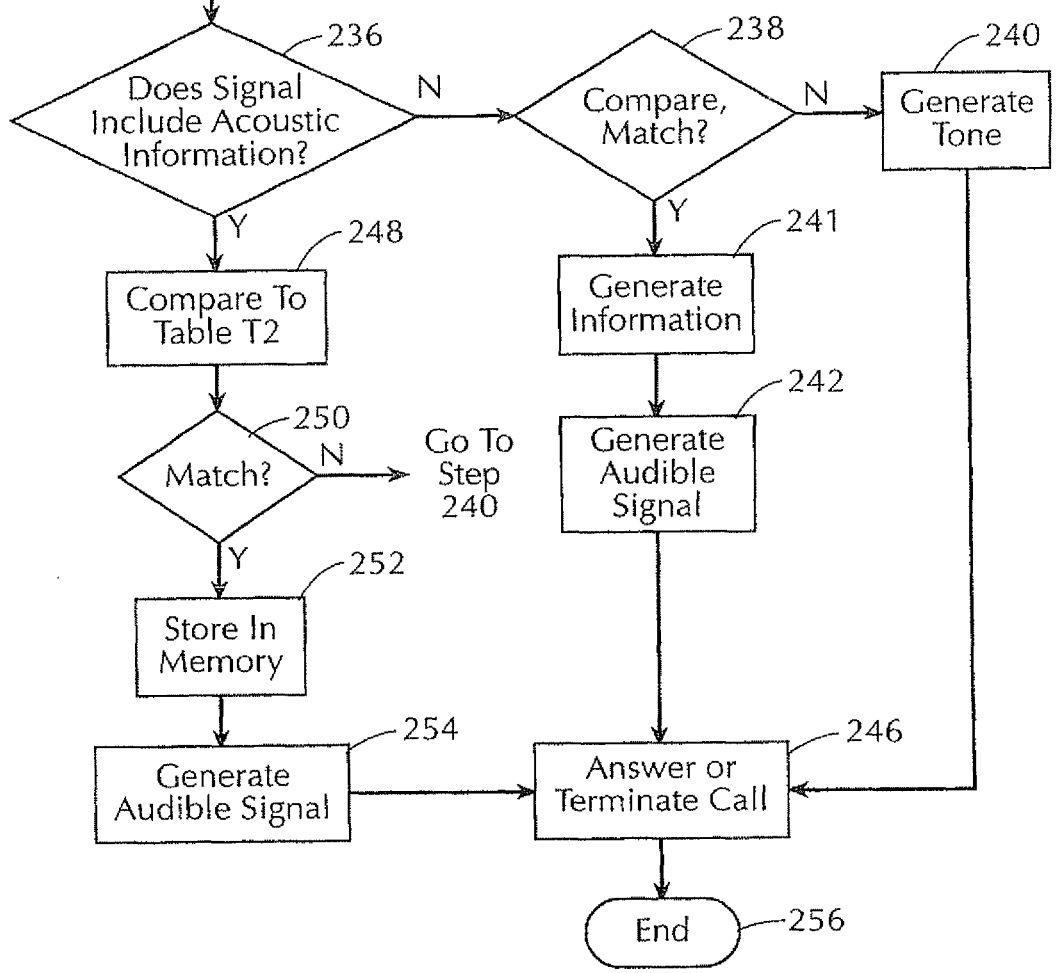

Referring now to FIG. 4b, the step 232 will now be described. In step 232, it is assumed that the user communication terminal 18a receives the call signal originally transmitted by the terminal 18b during the performance of either one of earlier steps 210, 220, or 230.

Within the terminal 18a, the received call signal is Within the terminal 18a, the received call signal is provided from the interface 23 to the controller 18. In accordance with one embodiment of the invention, the controller 18 then responds to receiving the call signal by examining the contents of the received signal to determine whether or not a predetermined information field of the signal includes acoustic information therein (i.e., acoustic information originally sent in one of earlier steps 220 or 230) (step 234). If the controller 18 determines that the predetermined information field of the received call signal does not include acoustic information ("N" in step 236), then control passes to step 238 where, in accordance with one embodiment of the invention, the controller 18 extracts information identifying the calling terminal 18b (e.g., terminal 18b's telephone number) from the received signal, and compares that extracted information to information stored in the memory locations Y1-Yn of table T1 in the memory 24 of terminal 18a, to determine whether or not the extracted information matches the information from any of those memory locations Y1-Yn.

If the extracted information does not match the information stored in any of those memory locations Y1-Yn ("N" in step 18 sets a flag to enable generation of a standard audible tone indicating the receipt of the incoming call, in a conventional manner. For example, the controller 18 may cause the audible tone to be generated by programming the D/A converter 17a to cause the D/A converter 17a to output a signal which causes the speaker 17b to generate the audible tone. The generation of the audible tone is analogous to the ringing of a conventional telephone when an incoming call is being received. Thereafter, control passes to step 246, where it is assumed that, at some time later, a user of the terminal 18a answers the incoming call by depressing one or more predetermined keys of the keypad 22 of the terminal 18a, or the incoming call signal is terminated by the calling party P2 in a known manner.

If the information extracted by the controller 18 from the received call signal in step 238 does match the information stored in one of the memory locations Y1-Yn from data table T1 of terminal 18a ("Y" in step 238), such as, for example, memory location Y1, then the controller 1 correlates that memory location Y1 to the corresponding memory location X1 from column X of table T1, and copies the acoustic information from that memory location X1 (step 241).

Thereafter, the controller 18 provides the copy of the acoustic information to the D/A converter 17a, which then responds by outputting a corresponding analog signal to the speaker 17, which, in turn, generates a corresponding audible signal indicating the receipt of the incoming call (step 242). In this manner, the acoustic information from the memory location X1 of the terminal 18a is used by the terminal 18a to generate a customized audio signal for notifying party P1 of the receipt of the call from terminal 18b.

Preferably, in step 242 the controller 18 provides a copy of the acoustic information to the D/A converter 17a at predetermined time intervals (e.g., every two seconds or so), determined by the timer 18-a, until controller 18 of terminal 18a recognizes in a known manner either that the call has been answered at the terminal 18a (by, e.g., party P1) or the call has been terminated from terminal 18b (by, e.g., party P2). In this manner, the audible signal is generated by the terminal 18a at the predetermined time intervals. In other embodiments, the acoustic information may be output from the controller 18 continuously or a predetermined, limited number (e.g., one or more) times, for predetermined, limited number (e.g., one or more) times, for causing the audible signal to be generated accordingly, until the call is answered or terminated in step 246. In accordance with one embodiment of the invention, the controller 18 also deletes the acoustic information from the memory location X1 which was correlated to previously in step 241, in response to recognizing, in a known manner, that the call has been answered or terminated in step 246.

Referring again to step 236, a case in which the controller 18 of terminal 18a determines that a predetermined information field of the received call signal does include acoustic information in step 236 ("Y" in step 236) will now be described. If the controller 18 determines in step 236 that the received call signal does include acoustic information in the predetermined information field thereof ("Y" in step 236), then control passes to step 248 where the controller 18 extracts information identifying the calling terminal 18b (e.g., the terminal 18b's telephone number) from another predetermined information field included in the received signal, and compares that extracted information to the information stored in the individual memory locations Z1-Zn from data table T2 of memory 24, to determine whether from any of those memory locations Z1-Zn (i.e., to determine whether or not the terminal 18a has been pre-authorized to output an audible signal based on the acoustic information included in the call signal received from calling terminal 18b) (step 250).

If the extracted information does not match the information stored in any of the memory locations Z1-Zn ("N" in step 250), then control passes to step 240 where the controller 18 sets a flag to cause a conventional alerting tone to be generated in the above-described manner, and the method then continues as described above.

If the acoustic information extracted by the controller 18 from the received call signal in step 248 does match the information stored in any one of the memory locations Z1-Zn from data table T2 ("Y" in step 250), then the controller 18 stores the extracted information in the memory 24 of the terminal 18a, preferably in the RAM 24a or Flash memory 24c (step 252). The controller 18 also provides a copy of that acoustic information to the D/A converter 17a to cause the D/A converter 17a to output a corresponding analog signal to the speaker 17, which, in turn, generates a corresponding audible signal indicating the receipt of the incoming call (step 254). In this manner, the acoustic information originally included in the call signal transmitted from the calling terminal 18b in earlier step 220 or 230, is employed at the receiving terminal 18a to generate a corresponding audible signal indicating the receipt of the call signal from calling terminal 18b.

Preferably, step 254 is performed so that the audible signal is generated by the terminal 18a at predetermined time intervals (e.g., every two seconds or so) (i.e., the controller 18 outputs the acoustic information to D/A converter 17a at predetermined time intervals), as determined by the clock 18-a, until the controller 18 recognizes in a known manner either that the call has been answered by the party P1 or terminated (by, e.g., party P2) (step 246). In other embodiments, the audible signal may be generated either continuously or a predetermined, limited number (e.g., one or more) times, in the above-described manner, until the call is either answered or terminated in step 246. In accordance with one embodiment of the invention, the controller 18 also deletes the acoustic information from the memory 24 in response to recognizing that the call signal is answered or terminated in step 246. Thereafter, control passes to step 256 where the method is terminated.

It should be noted that although the invention is described above (e.g., steps 238 and 241) in the context of the terminal 18a selecting pre-stored acoustic information based on communication identifier information (e.g., telephone number) included in a received call signal, in other embodiments of the invention, the selection of pre-stored acoustic information may be performed based on other predetermined criteria. For example, in accordance with another embodiment of the invention, the selection may be based on the time and/or day at which the call signal is received by the terminal 18a. In that embodiment, the information stored in the individual memory locations Y1-Yn may specify dates, time periods within a day, etc., depending on applicable operating criteria. When a call signal is received by the terminal 18a in step 232 of FIG. 4b, the controller 18 of that terminal 18a responds to receiving a predetermined information field (e.g., a beginning field) of that signal by referring to the clock 18-a to determine the time and/or date at which the call signal is received. Thereafter, and assuming that control passes through step 236 to step 238 in the above-described manner, then step 238 is performed by comparing the determined time and/or date to the information from the memory locations Y1-Yn of table T1 in the terminal 18a, to determine whether the determined time and/or date match or fall within a range defined by that stored information. For example, assuming that the controller 18 determines that the call signal has been received at 8:30 A.M., and/or on a particular date, and the information stored in memory location Y1 of table T1 in terminal 18a specifies a time period ranging from 8:00 A.M. to 9:00 A.M. and/or the same particular date, then the performance of step 238 results in the controller is recognizing that the determined time/date corresponds with the time period/date specified by the information from memory location Y1, and control then passes to step 241 where the controller 18 correlates that memory location Y1 to the corresponding memory location X1 from column X, and copies the acoustic information from that memory location X1 in the above-described manner (step 241). Control then passes to step 242 where the method then continues as described above.

In another embodiment, prior to the call signal being received by the terminal 18a, the party P1 may specify which stored acoustic information he desires to he employed for indicating the receipt of the call signal. For example, prior to the call signal being received by terminal 18a in step 232, the party P1 may enter command information into the memory 18a (through keypad 22 and controller 18) of the terminal 18a, specifying that the acoustic information stored in memory location X1 be employed for indicating the receipt of the call. Thereafter, assuming control passes through steps 234 and 236 to step 238 in the above-described manner, then the controller 18 performs step 238 by recognizing the command information stored in the memory 24 by the party P1, and by then passing control directly to step 241 (without performing the above-described decision in step 238), where the controller 18 then correlates that command information to the memory location X1, copies the acoustic information from that memory location X1 in the above-described manner (step 241), and performs step 242 as described above.

In accordance with a further embodiment of the invention, the selection of stored acoustic information can be made in a random manner. For example, in that embodiment the controller 18 of terminal 18a includes a random or pseudo-random number generator 18-b, and the controller 18 performs step 238 (without performing the above-described decision in step 238) by initializing the generator 18-b to cause it to randomly or pseudo-randomly generate a random or pseudo-random number. Thereafter, the controller 18 performs step 241 by correlating the generated number to a corresponding memory location X1-Xn, such as memory location X1, from the table T1 in terminal 18a, copying the acoustic information from that memory location X1 (step 241), and by then continuing the method at step 242 in the above-described manner. Any suitable type of random or pseudo-random generator may be employed as the generator 10-b in this embodiment, such as, by example, a binary shift PN generator.

It should be noted that although the invention has been described in the context of the memory locations Y1-Yn storing identifier information corresponding to only a single user communication device, more than a single identifier also may be stored in each memory location Y1-Yn, in association with each respective memory location X1-Xn, or some other desired configuration also may be provided for storing more than one user communication device identifier in association with acoustic information from a particular memory location X1-Xn. For example, identifier information identifying a plurality of user communication terminals relating to a particular category (e.g., "friends", "co-workers") may be stored in a single memory location Y1-Yn dedicated to that category, using any of the above-described storing techniques. As such, when call signals that include identifier information identifying any of the user communication devices belonging to that category are later individually received at the device 18a and correlated to the corresponding information within the memory location Y1-Yn in the table T1, in the above-described manner, a same audible signal is generated in each case, based on the acoustic information stored in the corresponding memory location X1-Xn corresponding to that category.

Figure 5:
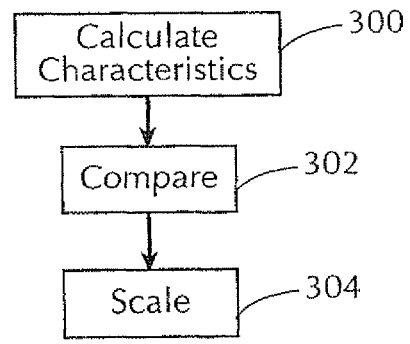
FIG. 5 shows a logical flow diagram of a method for normalizing acoustic information entered into a user communication device of the system of FIG. 1, during the performance of the methods of FIGS. 3a, 3b, 4a, and 4b.

A further embodiment of this invention will now be described. In accordance with this embodiment of the invention, a normalizing procedure is performed to acoustic information in the communication devices 18a, 18b, 19a, 19b, to enable any corresponding audible signals that are generated to have amplitudes that are within a predetermined range of amplitudes (and thus be normalized accordingly). This procedure compensates for differences between the amplitudes of recorded sound waves and desired amplitude levels (and thus standardizes the volumes of generated sounds). Reference is now made to FIG. 5, which illustrates a block diagram of a method in accordance with this embodiment of the invention. Step 300 of that diagram preferably is performed when an audible signal or acoustic information is entered into a user communication device, such as in step 122 of FIG. 3a, step 224 of FIG. 4a, and step 252 of FIG. 4b. For the purposes of this description only, the method of FIG. 5 will be described in the context of being performed in response to party P2 entering the audible signal 21b' into the communication terminal 18b in step 224, although it should be noted that a similar procedure also may be performed in response to acoustic information being entered in one or more of the steps 122 and 252 as well, and the method may be performed in other devices 18a, 19a, 19b besides terminal 19b.

In step 300, in response to the audible signal 21b' being entered into the microphone 21b of terminal 18b, and eventually being converted to digital form by the A/D converter 21a and provided to the controller 18 as acoustic information (as in step 224), the controller 18 of the terminal 21b performs a first predefined algorithm to compute one or more acoustic characteristics of the inputted signal, based on the digital values of the acoustic information received from A/D converter 21a. Those characteristics preferably include amplitude information representing a maximum amplitude of the entered audible signal 21b1', and a minimum amplitude of the entered signal 21b', and are determined based on individual bits or words (e.g., 16 bits) included in the acoustic information, using any suitable, known algorithm. For example, the algorithm may be performed by examining each 16 bit word received in succession, maintaining a running tally of the minimum and maximum values of all the received words, and maintaining a running total of all values of the received words (i.e., each time a value of a next word is determined to be less than a current minimal value, or greater than a current maximum value, that new value is recorded as the new minimum or maximum value, and is added to the running total). The minimum and maximum values remaining after all of the words have been received are considered to represent the minimum and maximum amplitudes, respectively, of the entered signal 21b'. The first predefined algorithm preferably is performed "on the fly", as a predetermined number of bits or words are received in the controller 2a (prior to those bits being stored in the memory 24 as described above).

Thereafter, in step 302 the controller 18 performs a second predefined algorithm using both the maximum and minimum amplitude values determined in step 300 and predetermined information (pre-stored in memory 24) representing desired maximum and minimum amplitude values, respectively, to determine a scaling factor to be used in scaling the digital values representing the entered signal 21b'. For example, the second predefined algorithm may include the following:

if $omin=omax$, then scaling factor=1.0, else scaling factor=$(dmax-dmin)/(omax-omin)$;

wherein omin and omax represent the determined minimum amplitude and maximum amplitude, respectively, of the audible signal 21b', and dmax and dmin represent the predetermined maximum value and predetermined minimum value, respectively.

Control then passes to step 304 where the controller 18 employs the determined scaling factor in a third predefined algorithm to scale the digital values (now stored in memory 24) representing the entered signal 21b', to cause the values to be placed within a range bounded by the predetermined maximum and minimum values. For example, according to one embodiment of the invention, the third predefined algorithm includes performing, for each individual word representing the audible signal 21b', the following algorithm (ALS) for scaling the word:

$$w(i)=\text{scaling factor}*(w(i)-omin)+dmin \quad \text{(ALG)}$$

wherein w(i) represents an individual word, and omin and dmin are defined as described above.

As an example, assuming that the controller 18 determines in step 300 that the maximum amplitude value of the entered audible signal 21b' is '150' and the minimum amplitude value of that signal is '0', and the corresponding predetermined maximum and minimum values are '300' and '0', respectively, then the performance of step 302 results in a determination that the digital values representing the entered signal should be scaled by a factor of '2', and step 304 is performed by multiplying those values by that factor '2'. In this manner, the acoustic information representing the entered signal 21b' is normalized in the memory 24. Thereafter, the method continues (in step 224) in the above-described manner. As a result of the normalization procedure, when the acoustic information is later D/A-converted and outputted again as an audible signal the signal will have an amplitude which is within a predetermined range of amplitudes values (and a resulting sound volume will be within a predetermined range of volumes).

In accordance with another embodiment, the acoustic characteristics obtained in step 300 are stored in the memory 24 along with the inputted acoustic information, for subsequent use in normalizing the acoustic information when it is later retrieved for use in generating an audible signal. For example, in this embodiment the steps 300 and 302 are performed in a similar manner as described above. However, after the acoustic characteristics are determined in step 300, they are stored in the same memory location as the entered acoustic information, and are subsequently included in the call signal later formed and transmitted (in step 230). Thereafter, assuming control passes to step 254 of FIG. 4b in the above-described manner, then the controller is of terminal 18a (after storing the received acoustic information in the memory 24 in step 252) performs step 254 by extracting the acoustic characteristics included in the received call signal (sent in earlier step 230), performing the second predefined algorithm in the above-described manner, using those characteristics (the maximum, and minimum amplitude values) and predetermined information (pre-stored in memory 24 of terminal 18a) representing desired maximum and minimum amplitude values, and by performing the third predefined algorithm in the above-described manner, based on the scaling factor determined as a result of the second predefined algorithm. The performance of the third predefined algorithm causes the scaling of the digital values (e.g., words) represented by the acoustic information now stored in memory 24 of terminal 18a, and causes those values to be placed within the range bounded by the predetermined maximum and minimum values. Thereafter, step 254 is performed as described above, where the controller 18 provides the normalized information to the D/A converter 17a, which then responds by outputting a corresponding analog signal to the speaker 17. The speaker 17 then generates a corresponding audible signal indicating the receipt of the incoming call (step 254). In this manner, the acoustic information is normalized in the receiving terminal 18*a*, after being received from the terminal 18*b*, and before being used to generate the audible signal in terminal 18*a*.

It should be realized that although the invention is described in the context of employing audible alerting signals to indicate the receipt of incoming calls, the invention is not limited as such. Where appropriate, the teaching of this invention can also be applied to user communication devices that employ any suitable device (e.g., a buzzer or a vibrator) for alerting a user of an incoming call or message, using any suitable type of alerting indicator.

Also, although not described above, it should be noted that acoustic information which is stored in any of the devices 19*a*, 19*b*, 18*a*, 19*b*, 33, and 7 may have any desired format, such as, e.g., a WAV file format (a CD-type audio sample format), a MPEG-3 encoded format, an ITU standard G.711 encoded format, a G.723 encoded format, a G.729 encoded format, an ETSI format (in the case of GSM voice encodings), and/or other suitable, proprietary formats. Where appropriate, the user communication devices 19*a*, 19*b*, 18*a*, 19*b*, 33, and 7 preferably also have any have a capability for encoding/decoding such acoustic information using any suitable types of encoding/decoding techniques.

Moreover, this invention may be employed in conjunction with any suitable types of communication protocols, as was previously described, and various protocol messages may be modified to carry acoustic and other information in accordance with this invention, such as for example, an H.323 SETUP message, an H.323 OpenLogicalChannel message, and a SIP INVITE message, used in Internet telephony, a Q.2931 message used in ATM telephony, a SETUP message used in GSM cellular telephony, and an IAM message used in ANSI ISUP.

While the invention has been particularly shown and described with respect to preferred embodiments thereof, it will be understood by those skilled in the art that changes in form and details may be made therein without departing from the scope and spirit of the invention.

What is claimed is:

1. A method comprising:
   receiving from a destination communication device a request to assign an audible signal to a user communication device;
   providing a digital representation of the audible signal to a memory of a service provider database in a memory location associated with the destination communication device;
   receiving request information from an interface of the user communication device, wherein the request information specifies that a call be placed from the user communication device to the destination communication device and requests retrieval of the digital representation from the service provider database;
   forwarding a call signal that includes the digital representation of the audible signal towards the destination communication device through an external interface;
   in response to receiving the call signal at the destination communication device, storing the digital representation in a memory of the destination communication device and generating the audible signal based on the digital representation included in the call signal; and
   deleting the digital representation from the memory of the destination communication device when the call is answered or terminated.

2. A method as set forth in claim 1, wherein the user communication device comprises at least one of a telephone and a radiotelephone.

3. A method as set forth in claim 1, wherein the providing step comprises the steps of:
   applying the audible signal to the interface of the user communication device, and producing a corresponding analog signal within the device;
   converting the analog signal to the digital representation; and
   storing the digital representation in the memory of the service provider database.

4. A user communication device, comprising:
   a communication interface coupled to an external interface of a service provider database having a message station and a storage device coupled to the message station, the communication interface being configured to transmit request information to the message station of the service provider database, the request information specifying that a call be placed to a destination communication device and that a digital representation of an audible signal stored in a memory location of the storage device associated with the destination device be retrieved from the storage device, the audible signal being input and assigned by the destination communication device to the user communication device on the service provider database;
   an input-user interface;
   a controller coupled to said memory, said communication interface, and said input-user interface, said controller being responsive to receiving from said input-user interface request information specifying that a call be placed to the destination communication device for retrieving the digital representation from said memory location of the storage device of the service provider database and forwarding a call signal that includes the retrieved digital representation through said communication interface towards the destination communication device;
   a further input-user interface having an input, and also having an output coupled to said controller, said further input-user interface being responsive to the audible signal being applied to that input for outputting a corresponding analog signal in said device; and
   a converter interposed between said further input-user interface and said controller, said converter for converting the analog signal to the digital representation, and wherein said controller is responsive to receiving the digital representation from said converter for storing the digital representation in said memory of the service provider database.

5. A user communication device as set forth in claim 4, wherein the user communication device comprises at least one of a telephone and a radiotelephone.

6. A tangible, non-transitory computer readable medium comprising program code for executing a method, the method comprising the steps of:
   receiving from a destination communication device a request to assign an audible signal corresponding to a user communication device;
   providing a digital representation of the audible signal to a memory of a service provider database in a memory location associated with the destination communication device;
   receiving request information from an interface of the user communication device, wherein the request information specifies that a call be placed from the user communication device to the destination communication device and requests retrieval of the digital representation from the service provider database; and forwarding a call signal that includes the digital representation towards the destination communication device through an external interface;

in response to receiving the call signal at the destination communication device, storing the digital representation in a memory of the destination communication device and generating the audible signal based on the digital representation included in the call signal; and deleting the digital representation from the memory of the destination communication device when the call is answered or terminated.

7. A tangible, non-transitory computer readable medium as set forth in claim 6, wherein the providing step comprises the steps of:

generating an analog signal in the user communication device in response to the audible signal being applied to the interface, the analog signal representing the audible signal;

converting the analog signal to the digital representation of the audible signal; and storing the digital representation in the memory of the service provider database.

8. A method for operating a communication system that comprises a plurality of user communication devices, the method comprising the steps of:

providing, by a service provider database, a digital representation of an audible signal from a memory in the service provider database to at least one of a plurality of memory locations of a memory of a first one of the plurality of user communication devices, wherein multiple memory locations are associated with each of the other plurality of communication devices;

forwarding a call signal from a second one of the user communication devices towards the first user communication device;

in response to the call signal being received at the first user communication device, randomly selecting one memory location among the multiple memory locations associated with the second one of the user communication devices;

generating the audible signal represented by the digital representation provided in the randomly selected memory location associated with the second one of the user communication devices; and deleting the digital representation from the randomly selected memory location after the call has been answered or terminated.

9. A method as set forth in claim 8, wherein each of the user communication devices comprises one of a telephone, a radiotelephone, and an information appliance.

10. A method as set forth in claim 8, wherein the providing step comprises the steps of:

applying audible signals to an input of a user input-interface of the first user communication device, and producing corresponding analog signals in that device;

in response to the inputting step, converting each individual analog signal to a corresponding one of the digital representations; and storing each individual digital representation in a respective one of the memory locations of the memory of the first user communication device.

11. A method as set forth in claim 8, wherein the step of selecting one memory location is performed based on predetermined information included in the received call signal.

12. A method as set forth in claim 8, further comprising the step of determining at least one of a date and a time at which the call signal is received at the first user communication device, and wherein the step of selecting one memory location is performed based on a result of the determining step.

13. A method as set forth in claim 8, further comprising a step of operating an input-user interface of the first user communication device to input information into that device specifying that one of the plurality of memory locations be selected, and wherein the selecting step further includes selecting the memory location specified by the inputted information.

14. A method as set forth in claim 8, wherein the generating step is performed by generating the audible signal at predetermined time intervals.

15. A method as set forth in claim 8, wherein the providing step includes a step of downloading each digital representation from the Internet, and into the memory of the first user communication device.

16. A method as set forth in claim 8, wherein the communication system also comprises at least one communication network having a storage device storing each digital representation, the first and second user communication devices are communicatively coupled to the at least one communication network, and the providing step comprises the steps of:

providing each digital representation from the storage device of the at least one communication network to the first user communication device; and storing each digital representation provided to the first user communication device in a respective one of the memory locations of the memory of the first user communication device.

17. A method as set forth in claim 16, wherein the plurality of user communication devices are communicatively coupled to the at least one communication network, and wherein the method further comprises the steps of:

providing each digital representation in a memory of one of the user communication devices besides the first user communication device;

communicating each digital representation from the memory of the one user communication device to the at least one network; and storing each digital representation in the storage device of the at least one network, prior to providing each digital representation from the storage device to the first user communication device.

18. A method as set forth in claim 17, further comprising the step of communicating a request for each digital representation from one of the first and second user communication devices to the at least one communication network, and wherein the step of providing each digital representation from the storage device to the first user communication device is performed in response to the request being received in the at least one communication network.

19. A method as set forth in claim 18, wherein the step of communicating the request is performed a plurality of times at respective predetermined time intervals.

20. A method as set forth in claim 19, wherein the storage device includes a plurality of memory locations, each storing a respective digital representation of a corresponding audible signal, and wherein the providing step comprises the steps of:

selecting at least one of the plurality of memory locations of the storage device; and storing the digital representation from the at least one memory location selected in that selecting step to the memory of the first user communication device.

21. A method as set forth in claim 20, further comprising the step of communicating information specifying that the at least one memory location of the storage device be selected, from the first user communication device to the at least one communication network, and wherein the step of selecting the at least one memory location of the storage device is performed in response to that information being received in the at least one communication network.

22. A method for operating a communication system comprising a plurality of user communication devices, the method comprising the steps of:
    initiating a call at a first one of the user communication devices, the call being placed to a second one of the user communication devices;
    inserting a digital representation of an audible signal into a call signal used for placing the call;
    forwarding the call signal towards the second user communication device;
    in response to receiving the call signal at the second user communication device, storing the digital representation in a memory of the second user communication device and generating the audible signal based on the digital representation included in the call signal; and
    deleting the digital representation from the memory of the second user communication device when the call is answered or terminated.

23. A method as set forth in claim 22, wherein each of the user communication devices comprises one of a telephone, a radiotelephone, and a user information appliance.

24. A method as set forth in claim 22, further comprising the steps of:
    applying the audible signal to an input of a user interface of the first user communication device, and generating a corresponding analog signal in the first user communication device; and
    converting the analog signal to the digital representation, wherein the inserting step is performed by inserting that digital representation in the call signal, within the user communication device.

25. A method as set forth in claim 24, further comprising the steps of:
    determining at least one acoustic characteristic of the audible signal, based on the digital representation;
    comparing the at least one acoustic characteristic determined in the determining step to at least one predetermined acoustic characteristic to identify a scaling factor; and
    scaling the digital representation based on the scaling factor to normalize the at least one acoustic characteristic of the audible signal.

26. A method as set forth in claim 22, wherein the call signal includes predetermined information, and further comprising the step of determining whether the predetermined information included in the call signal corresponds to information stored in the memory of the second user communication device, in response to the call signal being received at the second user communication device, and wherein the generating step is performed in response to determining that the predetermined information does correspond to the information stored in the memory of the second user communication device.

27. A method as set forth in claim 22, wherein the communication system also comprises at least one communication network having a storage device storing the digital representation of the audible signal, the first and second user communication devices are communicatively coupled to the at least one communication network, and the method further comprises the steps of:
    prior to the inserting step, transmitting the call signal from the first user communication device, through at least a portion of the at least one communication network; and
    in response to the call signal being received in the at least one communication network, retrieving the digital representation from the storage device, wherein the inserting step is performed by inserting the digital representation retrieved from the storage device in the call signal.

28. A method as set forth in claim 27, wherein the at least one communication network includes at least a portion of the Internet.

29. A communication system, comprising:
    a first user communication device comprising a first communication interface, an input user interface, and a controller coupled to the first communication interface and the input user interface, the controller being responsive to receiving from the input user interface request information specifying that a call be placed from the first user communication device and requesting retrieval of a digital version of an audible signal from a service provider database and for forwarding a call signal that includes the request information through an external interface coupled to the first communication interface; and
    a second user communication device comprising a second communication interface coupled to the external interface, and an audible signal generator portion coupled to the second communication interface, wherein the audible signal generator portion is responsive to receiving the digital version from the second communication interface for generating the audible signal based on the digital representation included in the call signal;
    wherein the service provider storage device stores the digital version of the audio signal in a memory location associated with the second user communication device.

30. A communication system as set forth in claim 29, wherein each of the first and second user communication devices comprises one of a telephone, a radiotelephone, and a user information appliance.

31. A communication system as set forth in claim 29, wherein the call signal includes predetermined information, the second user communication device also comprises a memory, and the audible signal generator portion is responsive to receiving the call signal for determining whether the predetermined information included in the call signal corresponds to information stored in the memory of the second user communication device, and generates the audible signal in response to determining that the predetermined information does correspond to the information stored in the memory of the second user communication device.

32. A communication system, comprising:
    a first user communication device, comprising a first communication interface, an input user interface, and a controller coupled to the first communication interface and the input user interface, the controller being responsive to receiving from the input user interface information specifying that a call be placed from the first user communication device and that a digital representation of at least one audible signal be retrieved from a storage device, for forwarding a call signal through the first communication interface;
    at least one communication network, having a second communication interface coupled to the first communication interface of said first user communication device, and also having a third communication interface, said at least one communication network comprising a message station and the storage device coupled to the message station, wherein the storage device stores the digital representation of the at least one audible signal, and the message station is responsive to receiving the call signal for (a) retrieving the digital representation from the storage device, (b) inserting the retrieved digital representation in the call signal, and (c) forwarding the call signal through the third communication interface; and a second user communication device comprising a fourth communication interface coupled to the third communication interface of the at least one communication network, and also comprising a controller configured to determine whether the second user communication device is pre-authorized to output the audio signal received via the call signal and an audible signal generator portion coupled to the fourth communication interface, wherein the audible signal generator portion is response to receiving the call signal for generating the audible signal based on the digital representation included in the call signal;

wherein the digital representation of the at least one audible signal is stored in a memory location of the storage device associated with the second user communication device.

33. A communication system as set forth in claim 32, wherein the at least one communication network includes at least a portion of the Internet.

34. A communication system, comprising:

a first user communication device comprising first communication interface means coupled to an external interface, and control means operable for forwarding a call signal through the first communication interface means; and a second user communication device comprising storage means, second communication interface means coupled to the external interface, and alerting signal generator means coupled to the storage means and the second communication interface means, wherein the storage means includes a plurality of memory locations, each of which store a digital representation of a corresponding user-perceptible signal, and the alerting signal generator means is responsive to the call signal being received through the second communication interface means for selecting one of the memory locations and for generating the user-perceptible alerting signal represented by the digital representation stored in the selected one of the memory locations, wherein the call signal indicates an attempt to establish communication between the first user communication device and the second user communication device and wherein the digital representation stored in the selected memory location is deleted after communication is established or the attempt to establish communication is terminated.

35. A user communication device, comprising:

storage means for storing a plurality of signals each representing a user-perceptible alerting signal received from a service provider database;

input means for (a) inputting identifiers identifying respective ones of a plurality of calling sources from which call signals may be received, and (b) assigning at least one signal to each of the calling sources such that respective ones of a plurality of user-perceptible alerting signals that are to be individually generated in response to calls being received from respective ones of the calling sources; and control means coupled to said storage means and said input means, said control means being responsive to receiving from said input means at least one of the identifiers and multiple corresponding signals for storing the multiple corresponding signals in association with the at least one identifier in said storage means, and configured to randomly select one of the multiple corresponding signals from said storage means in response to receiving the signal from the input means, and further configured to delete the randomly selected one of the multiple corresponding signals from said storage means after a call from the respective one of the calling sources has been answered or terminated.

36. A method as set forth in claim 22, wherein deleting the digital representation from the memory of the second user communication device when the call is answered or terminated occurs every time the call is answered by the second user communication device.

37. A method as set forth in claim 22, wherein deleting the digital representation from the memory of the second user communication device when the call is answered or terminated occurs every time the call is terminated.

* * * * *